(12) United States Patent
Duttagupta et al.

(10) Patent No.: US 11,500,817 B2
(45) Date of Patent: Nov. 15, 2022

(54) ASYNCHRONOUS DELETION OF LARGE DIRECTORIES

(71) Applicant: Cohesity, Inc., San Jose, CA (US)

(72) Inventors: Anirvan Duttagupta, San Jose, CA (US); Shreyas Talele, Santa Clara, CA (US); Anubhav Gupta, Sunnyvale, CA (US); Zhihuan Qiu, San Jose, CA (US); Malini Mahalakshmi Venkatachari, Santa Clara, CA (US); Prashant Saraswat, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/871,408

(22) Filed: May 11, 2020

(65) Prior Publication Data
US 2021/0349853 A1   Nov. 11, 2021

(51) Int. Cl.
*G06F 17/00*   (2019.01)
*G06F 16/16*   (2019.01)
*G06F 16/13*   (2019.01)

(52) U.S. Cl.
CPC ............ *G06F 16/162* (2019.01); *G06F 16/13* (2019.01)

(58) Field of Classification Search
None
See application file for complete search history.

(56) References Cited

U.S. PATENT DOCUMENTS

| | | | | |
|---|---|---|---|---|
| 6,985,161 B1 * | 1/2006 | Politis | ................ | G06T 11/60 345/629 |
| 8,412,688 B1 * | 4/2013 | Armangau | ............ | G06F 16/128 707/695 |
| 10,592,475 B1 * | 3/2020 | Ghidireac | ............ | G06F 16/182 |
| 2003/0118250 A1 * | 6/2003 | Tlaskal | ................ | G06T 11/60 382/284 |
| 2004/0172421 A1 * | 9/2004 | Saito | ................ | G06F 16/184 |
| 2006/0155723 A1 * | 7/2006 | Kumar | ................ | H04L 67/306 |
| 2006/0180007 A1 * | 8/2006 | McClinsey | .......... | G10H 1/0008 84/645 |
| 2006/0259527 A1 * | 11/2006 | Devarakonda | .......... | G06F 16/13 707/999.203 |
| 2007/0185936 A1 * | 8/2007 | Derk | ................ | G06F 11/1451 |
| 2010/0011037 A1 * | 1/2010 | Kazar | ................ | G06F 3/0659 707/E17.01 |
| 2012/0136811 A1 * | 5/2012 | Proctor | ................ | G06N 5/047 706/10 |
| 2012/0136821 A1 * | 5/2012 | Proctor | ................ | G06N 5/047 706/47 |

(Continued)

OTHER PUBLICATIONS

Anonymous, "Why is unlink successful on an open file?" Stack Overflow, Apr. 25, 2014, https://stackoverflow.com/questions/23287997/why-is-unlink-successful-on-an-open-file Accessed Apr. 27, 2020.

*Primary Examiner* — Hasanul Mobin
(74) *Attorney, Agent, or Firm* — Van Pelt, Yi & James LLP

(57) ABSTRACT

A request to delete a directory from a storage is received. The directory is unlinked from a parent metadata object. A success confirmation that the directory is unlinked from the parent metadata object is provided. After the success confirmation is provided, one or more metadata objects of the directory are marked for deletion, and the one or more marked metadata objects and at least one of their descendant metadata objects are identified and deleted.

19 Claims, 25 Drawing Sheets

(56) References Cited

U.S. PATENT DOCUMENTS

| | | | |
|---|---|---|---|
| 2019/0311049 A1* | 10/2019 | Bhargava M R | G06F 16/178 |
| 2020/0293506 A1* | 9/2020 | Gupta | G06F 16/24568 |
| 2021/0004302 A1* | 1/2021 | Yu | G06F 21/60 |
| 2021/0349853 A1* | 11/2021 | Duttagupta | G06F 16/162 |

* cited by examiner

400 ⟶

| TreeID | NodeID | ChildrenID | Ref Count | Value | ChunkID | Chunk FileID |
|---|---|---|---|---|---|---|
| 1 | FR1 | FI1, FI2 | 0 | | | |
| 1 | FI1 | FL1, FL2, FL3, FL4 | 2 | | | |
| 1 | FI2 | FL5, FL6, FL7, FL8 | 1 | | | |
| 1 | FL1 | | 1 | Brick 1 | $SHA\text{-}1_a$ | Chunk File 1 |
| 1 | FL2 | | 1 | Brick 2 | $SHA\text{-}1_b$ | Chunk File 1 |
| 1 | FL3 | | 1 | Brick 3 | $SHA\text{-}1_c$ | Chunk File 1 |
| 1 | FL4 | | 1 | Brick 4 | $SHA\text{-}1_d$ | Chunk File 1 |
| 1 | FL5 | | 2 | Brick 5 | $SHA\text{-}1_e$ | Chunk File 2 |
| 1 | FL6 | | 2 | Brick 6 | $SHA\text{-}1_f$ | Chunk File 2 |
| 1 | FL7 | | 2 | Brick 7 | $SHA\text{-}1_g$ | Chunk File 2 |
| 1 | FL8 | | 1 | Brick 8 | $SHA\text{-}1_h$ | Chunk File 2 |
| 2 | FR2 | FI1, FI3 | 0 | | | |
| 2 | FI3 | FL5, FL6, FL7, FL9 | 1 | | | |
| 2 | FL9 | | 1 | Brick 8' | $SHA\text{-}1_i$ | Chunk File 3 |

| Chunk File ID | Chunk ID | Chunk File Offset | Storage Node | Primary Owner | Secondary Owner |
|---|---|---|---|---|---|
| Chunk File 1 | SHA-1$_a$ | 0 – 256 kb | 1, 3 | File 1 | File 2 |
| Chunk File 1 | SHA-1$_b$ | 256 kb – 512 kb | 1, 3 | File 1 | File 2 |
| Chunk File 1 | SHA-1$_c$ | 512 kb – 768 kb | 1, 3 | File 1 | File 2 |
| Chunk File 1 | SHA-1$_d$ | 768 kb – 1024 kb | 1, 3 | File 1 | File 2 |
| Chunk File 2 | SHA-1$_e$ | 0 – 256 kb | 2, 4 | File 1 | File 2 |
| Chunk File 2 | SHA-1$_f$ | 256 kb – 512 kb | 2, 4 | File 1 | File 2 |
| Chunk File 2 | SHA-1$_g$ | 512 kb – 768 kb | 2, 4 | File 1 | File 2 |
| Chunk File 2 | SHA-1$_h$ | 768 kb – 1024 kb | 2, 4 | File 1 | - |
| Chunk File 3 | SHA-1$_i$ | 0 – 256 kb | 2, 3 | File 2 | - |

ASYNCHRONOUS DELETION OF LARGE DIRECTORIES

BACKGROUND OF THE INVENTION

A primary system is configured to store file system data. The primary system is configured to perform a backup snapshot and send the file system data to a storage system. The backup snapshot may be a full backup snapshot or an incremental backup snapshot. A full backup snapshot includes all of the file system data of the primary system at a particular moment of time. An incremental backup snapshot includes the file system data of the primary system that has changed since a previous backup snapshot. The primary system may modify some of the file system data and/or delete some of the file system data in the time between backup snapshots.

BRIEF DESCRIPTION OF THE DRAWINGS

Various embodiments of the invention are disclosed in the following detailed description and the accompanying drawings.

FIG. 4A is a diagram illustrating a data structure in accordance with some embodiments.

FIG. 4B is a diagram illustrating a data structure in accordance with some embodiments.

DETAILED DESCRIPTION

Figure 1:
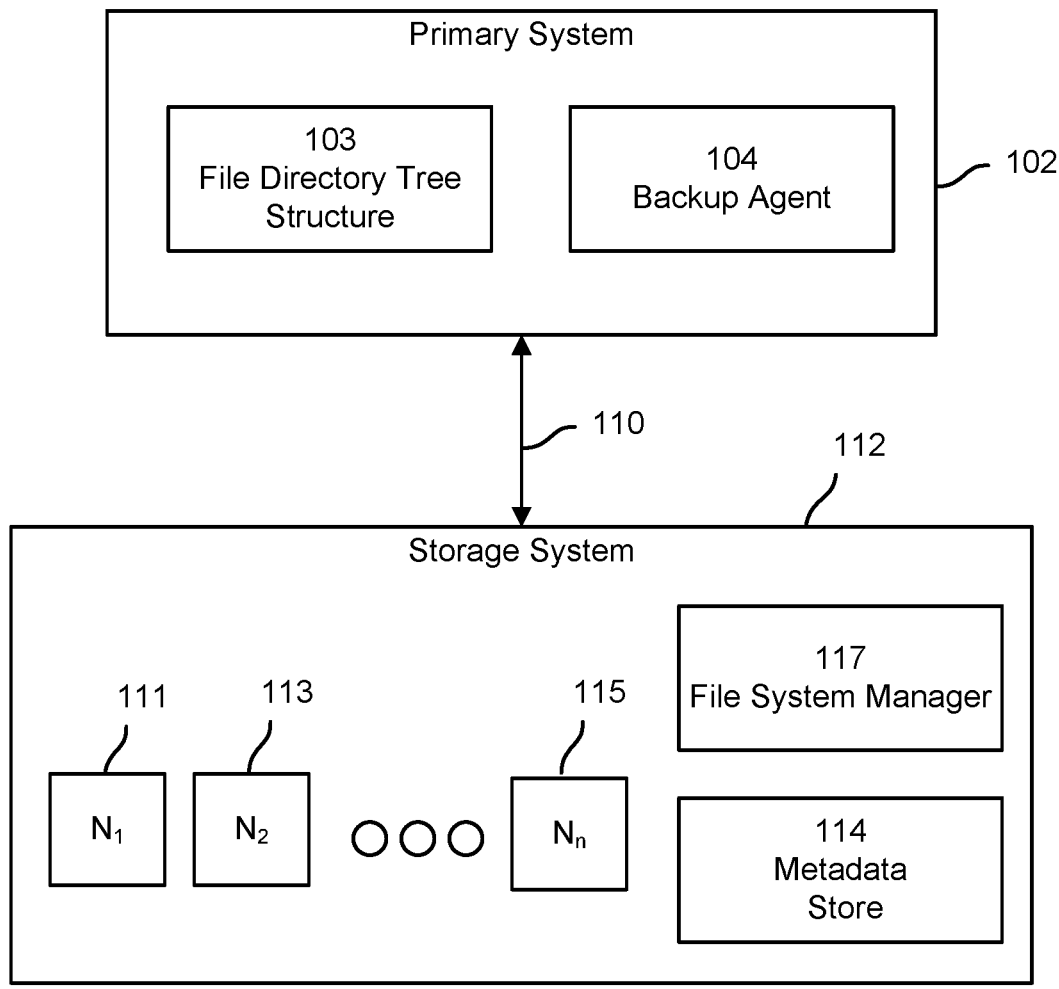
FIG. 1 is a block diagram illustrating a system for performing asynchronous deletion of large directories.

A primary system is configured to implement a file directory tree structure to organize its directories, sub-directories, and files. A file directory tree structure may be comprised of a root node, one or more levels of intermediate nodes, and a plurality of leaf nodes. A node of the file directory tree structure may correspond to a directory, a sub-directory, or a file. For example, a root node of the file directory tree structure may correspond to the root directory "C:\," an intermediate node may correspond to the directory "C: \Users," another intermediate node may correspond to the sub-directory "C:\Users\User1," and a leaf node may correspond to a file "test.txt." The file path for "test.txt" may be represented as "C:\Users\User1\test.txt." Each node of the file directory tree structure has a corresponding inode. An inode is a data structure that describes a file system object, such as a file, directory, or sub-directory. A directory inode may store a pointer to one or more other inodes. For example, the root directory inode may store one or more pointers to one or more other inodes.

A backup snapshot may be taken of a primary file system's file system data and stored in a storage system. The file system data may include metadata associated with the file directory tree structure of the primary system. A storage system is configured to ingest and back up the file system data included in a backup snapshot. The storage system is comprised of a plurality of storage nodes. The storage system is configured to store across the plurality of storage nodes the file system data included in the backup snapshot. The storage system organizes a view of the file system data using a tree data structure. A view of the file system data may be comprised of a file system metadata snapshot tree, which may be based on a B+ tree structure (or other type of tree structure in other embodiments) and one or more metadata structures. A metadata structure may correspond to a content file stored on the primary system. In some embodiments, a metadata structure corresponds to a workload of the primary system (e.g., virtual machine, container, pod, database, etc.).

A file system metadata snapshot tree includes a root node, one or more levels of one or more intermediate nodes associated with the root node, and one or more leaf nodes associated with an intermediate node of the lowest intermediate level. The root node of a file system metadata snapshot tree includes one or more pointers to one or more intermediate nodes. Each intermediate node includes one or more pointers to other nodes (e.g., a lower intermediate node or a leaf node). A leaf node may store file system metadata, data associated with a content file that is less than or equal to a limit size (e.g., 256 kB), an identifier of a data brick, one or more pointers to one or more metadata structures (e.g., Blob structure), a pointer to a data chunk stored on the storage system, a pointer to another leaf node, inode metadata, etc. A leaf node that stores the data associated with a content file that is less than or equal to the limit size may be referred to as a file data fragment.

A leaf node of the file system metadata snapshot tree may correspond to an inode. For example, some of the leaf nodes of the file system metadata snapshot tree may correspond to the plurality of inodes included in the file directory tree structure of the primary system. A leaf node that corresponds to a directory inode may include a pointer to a leaf node that corresponds to a directory data fragment associated with the directory inode. The directory data fragment may store one or more entries. Each of the one or more entries may store a child identifier (ID) (e.g., file name, directory name, sub-directory name) and an inode ID. For example, a parent inode of a file directory tree structure of the primary system may include a first pointer to a first child inode, a second pointer to a second child inode, and a third pointer to a third child inode. The file system metadata snapshot tree may include a leaf node that corresponds to the parent inode, a leaf node that corresponds to the first child inode, a leaf node that corresponds to the second child inode, a leaf node that corresponds to the third child inode, and a directory data fragment leaf node that is associated with the parent inode. The directory data fragment that is associated with the parent inode may store a first entry that identifies a first child (e.g., file name, directory name, sub-directory name) and an identifier of the first child inode, a second entry that identifies a second child and an identifier of the second child inode, and a third entry that identifies a third child and an identifier of the third child inode. The leaf node that corresponds to the parent inode stores a pointer to the directory data fragment leaf node that is associated with the parent inode. In this example, the directory data fragment leaf node that is associated with the parent inode stores a first pointer to the leaf node corresponding to the first child inode, a second pointer to the leaf node corresponding to the second child inode, and a third pointer to the leaf node corresponding to the third child inode.

Regardless if the view of the file system data corresponds to a full backup snapshot or an incremental backup snapshot, the view of the file system data corresponding to the backup snapshot may be a fully hydrated backup snapshot that provides a complete view of the primary system corresponding to a moment in time when the backup snapshot was performed. A fully hydrated backup is a backup that is ready for use without having to reconstruct from a plurality of backups to use it. Other systems may reconstruct a backup by starting with a full backup and applying one or more changes associated with one or more incremental backups to the data associated with the full backup. In contrast, any file stored in the storage volume of a primary system at a particular time and the file's contents, for which there is an associated backup snapshot, may be determined from the file system metadata snapshot tree, regardless if the file system metadata snapshot tree corresponds to a full backup snapshot or an incremental backup snapshot.

Creating an incremental backup snapshot may include copying data of the storage volume(s) that was not previously backed up. However, the file system metadata snapshot tree corresponding to the incremental backup snapshot provides a complete view of the storage volume(s) at the particular moment in time because it includes references to data of the storage volume that was previously stored. For example, the file system metadata snapshot tree corresponding to the incremental backup snapshot may be generated by cloning a root node associated with a file system metadata snapshot tree corresponding to a previous backup snapshot. A root node associated with the file system metadata snapshot tree corresponding to the incremental backup snapshot may include one or more references to intermediate nodes associated with file system metadata snapshot trees corresponding to one or more previous backup snapshots. An intermediate node associated with the file system metadata snapshot tree corresponding to the incremental backup snapshot may include one or more references to leaf nodes of file system metadata snapshot trees corresponding to one or more previous backup snapshots.

Since a previous backup snapshot, some of the file system data associated with the primary system may have been deleted from the primary system. An incremental backup snapshot of the primary system may include metadata that indicates the file system data associated with the primary system that has been deleted since the previous backup snapshot. For example, the metadata may indicate that a directory was deleted from the file directory tree structure of the primary system. A storage system may generate a file system metadata snapshot tree corresponding to the incremental backup snapshot by not only adding one or more nodes corresponding to new file system data and modifying one or more nodes corresponding to modified file system data, but also removing references to one or more nodes that correspond to deleted file system data.

A large amount of file system data (e.g., greater than a threshold amount of data) of the primary system may have been deleted since a previous backup snapshot. For example, a directory with a large number of files (e.g., greater than a threshold number of files) may have been deleted. The directory may include one or more sub-directories, which in turn include links to one or more sub-directories and/or one or more files. Other systems may remove all references to the nodes associated with a previous backup snapshot that correspond to the deleted file system data (e.g., one or more deleted directories, one or more deleted subdirectories, and/or one or more deleted files). However, removing all of the references from a file system metadata snapshot tree that corresponds to an incremental backup snapshot may take an amount of time that is proportional to the actual number of files and directories that are descendants of the directory that was deleted; this amount of time may be quite large and unpredictable without knowing how many files and directories are in the deleted directory, which may require traversing the deleted directory. The file system metadata snapshot tree that corresponds to the incremental backup snapshot may not be accessible until all of the references to the nodes associated with the previous backup snapshot that correspond to the deleted file system data have been removed because file system data that was not on the primary system when the incremental backup snapshot was performed should not be accessible. The amount of time needed to generate the file system metadata snapshot tree corresponding to the incremental backup snapshot may be reduced to a predictable amount by enabling access to the file system metadata snapshot tree after unlinking a child node that corresponds to a deleted directory from its parent node, i.e., a node that references the child node. In this way, access to the updated file system metadata snapshot tree may be enabled before requiring individually removing all references to nodes associated with the previous backup snapshot that correspond to the deleted file system data. Once the child node has been unlinked, the ability to traverse the updated file system metadata snapshot tree to the child node has been interrupted and the sometimes time consuming task of removing all reference to nodes related to deleted file system data may take place later.

Figure 6A:
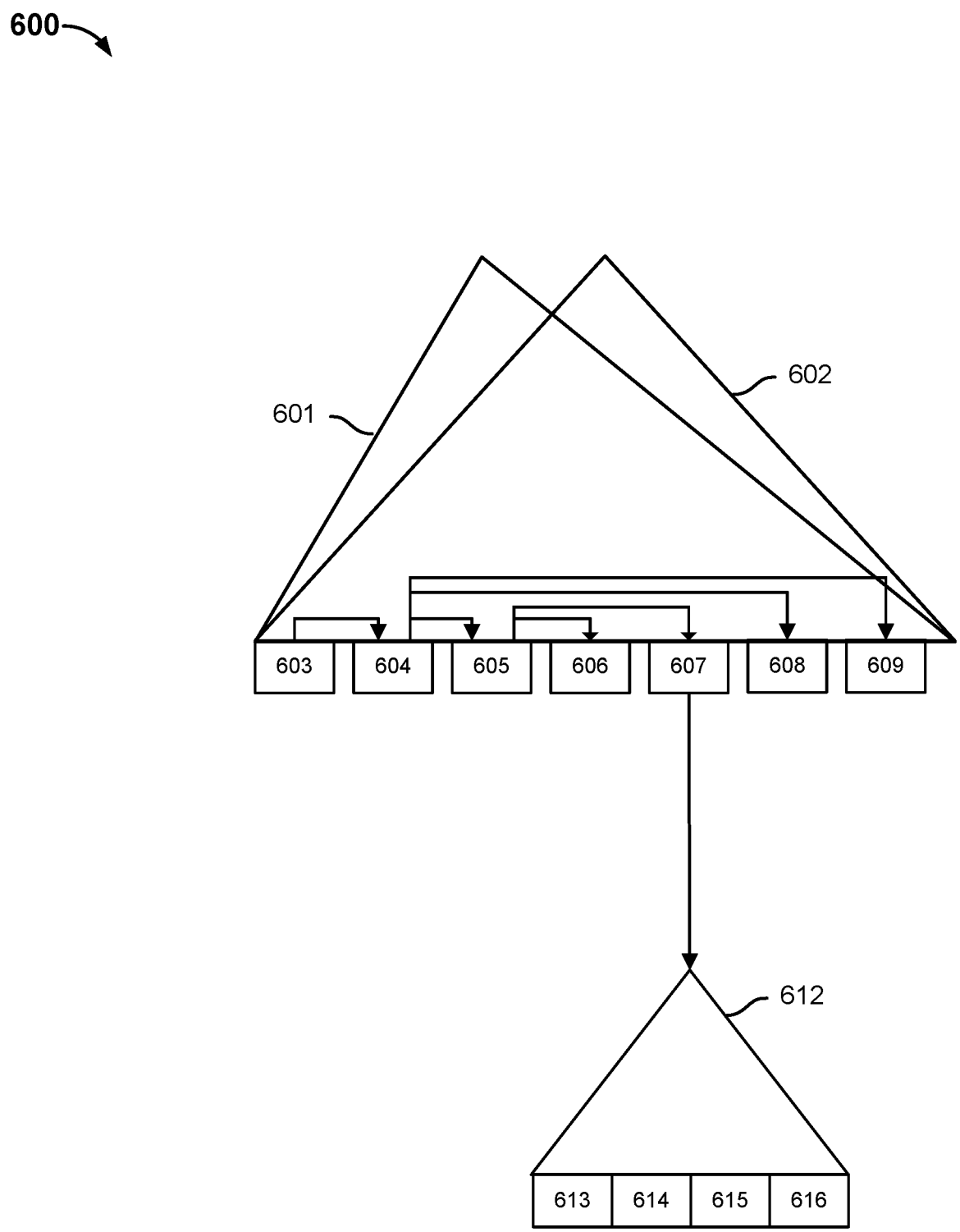
FIG. 6A is a diagram illustrating a tree data structure in accordance with some embodiments.

After the file system metadata snapshot tree associated with the previous backup snapshot is cloned, the file system metadata snapshot tree associated with the incremental backup snapshot (i.e., the cloned file system metadata snapshot tree) initially includes a leaf node that corresponds to the parent inode of the deleted directory (e.g., leaf node 603 of FIG. 6A), a leaf node that corresponds to the inode of the deleted directory (e.g., leaf node 605 of FIG. 6A), and a directory data fragment node that is associated with the leaf node that corresponds to the parent inode of the deleted directory (e.g., leaf node 604 of FIG. 6A). The directory data fragment node that is associated with the leaf node that corresponds to the parent inode of the deleted directory includes an entry that references the deleted directory.

The storage system may unlink the leaf node that corresponds to the inode of the deleted directory (referred herein as a "deleted directory root node") from the leaf node that corresponds to the parent inode of the deleted directory root node (referred herein as a "deleted directory root parent node") by updating the deleted directory root parent node to include an update intent that references a node that is to be deleted, updating the deleted directory root node to include an update intent that indicates the node is to be deleted, and removing an entry that corresponds to the deleted directory from the directory data fragment node associated with the deleted directory root parent node. Modifying the deleted directory root parent node and the deleted directory root node to include corresponding update intents enables the storage system to resume the unlinking process in the event the storage system crashes during the unlinking process.

Figure 6B:
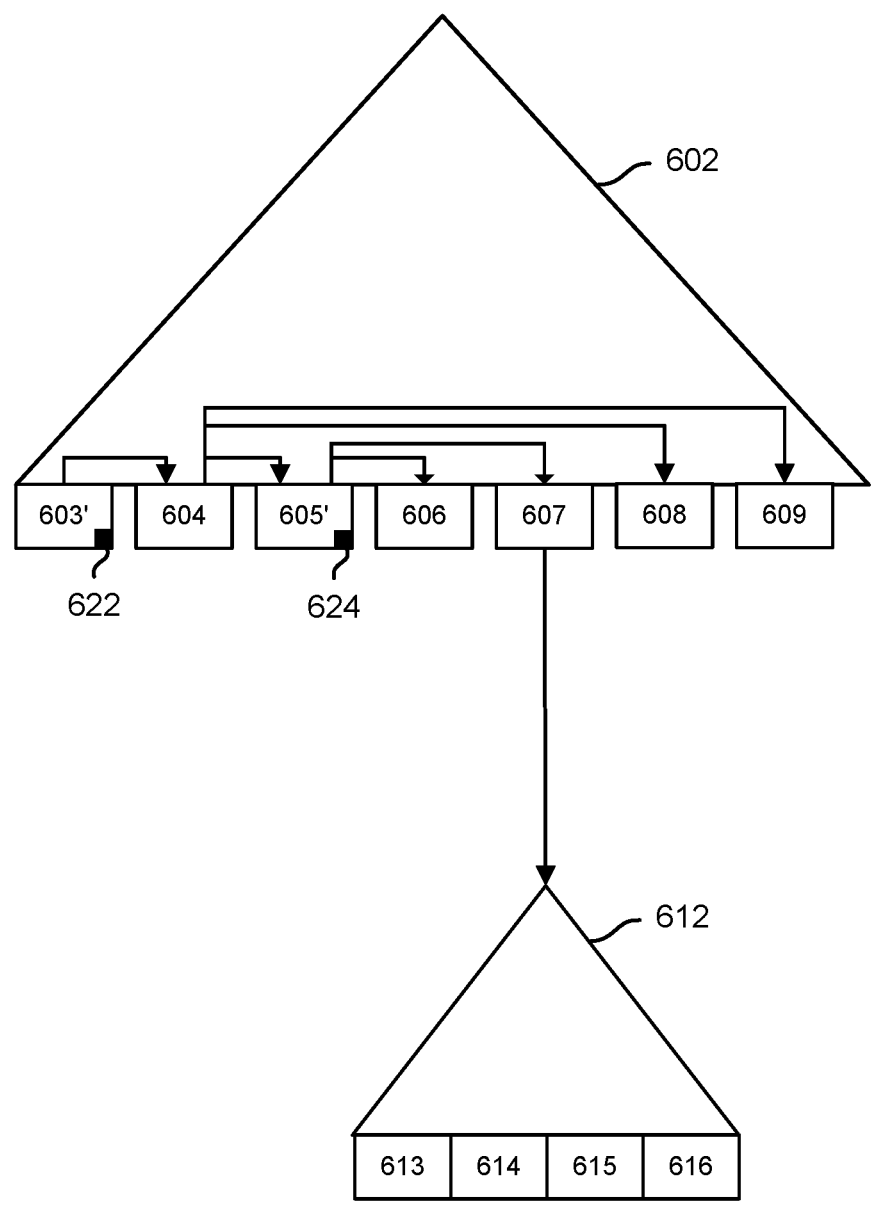
FIG. 6B is a diagram illustrating a tree data structure in accordance with some embodiments.

The storage system may update the deleted directory root parent node (e.g., leaf node 603 of FIG. 6A) and the deleted directory root node (e.g., leaf node 605 of FIG. 6A) to include corresponding intents by performing corresponding shadow copies of the nodes and updating the corresponding shadow copies of the nodes to include the corresponding intents (e.g., leaf nodes 603', 605' of FIG. 6B). The storage system may remove an entry that corresponds to the deleted directory from the directory data fragment node (e.g., leaf node 604 of FIG. 6B) associated with the deleted directory root parent node by performing a shadow copy of the directory data fragment node and removing the entry that corresponds to the deleted directory from the shadow copy of the directory data fragment node (e.g., leaf node 604' of FIG. 6B).

A shadow copy of a node is performed when the node is included in a plurality of file system metadata snapshot trees (e.g., the file system metadata snapshot tree that corresponds to a previous backup snapshot and the initial file system metadata snapshot tree that corresponds to the incremental backup snapshot) and a value stored by the node has been updated between backup snapshots. The value stored by a node that is associated with a file system metadata snapshot tree that corresponds to a previous backup snapshot is immutable. The value stored in the shadow copy of the node may be updated because the shadow copy of the node is not shared with one or more file system metadata snapshot trees that correspond to one or more previous backup snapshots; rather, the shadow copy of the node is associated with the file system metadata snapshot tree that corresponds to a current backup snapshot (i.e., the incremental backup snapshot).

The file system metadata snapshot tree corresponding to the incremental backup snapshot may be accessible after one or more deleted directory root nodes are unlinked from their corresponding deleted directory root parent nodes. Thus, the amount of time needed to generate an accessible file system metadata snapshot tree corresponding to the incremental backup snapshot has been reduced from the amount of time needed to remove all references to nodes associated with the previous backup snapshot that correspond to the deleted file system data from the file system metadata snapshot tree corresponding to the incremental backup snapshot to the amount of time needed to unlink deleted directory root nodes from their corresponding deleted directory root parent nodes. Subsequently, the file system metadata snapshot tree corresponding to the incremental backup snapshot and its associated data are accessible, and a user, application, or process is unable to access the deleted file system data because the one or more deleted directory root nodes have been unlinked from their corresponding deleted directory root parent nodes.

A deleted directory root node of the file system metadata snapshot tree corresponding to the incremental backup snapshot may be associated with one or more directory data fragment nodes. During a garbage collection process, the one or more directory data fragment nodes of the deleted directory root node are marked for deletion (e.g., garbage) and the deleted directory root node is deleted. The one or more directory data fragments nodes associated with the deleted directory root node (e.g., leaf nodes 606, 607 of FIG. 6C) may be marked for deletion by performing corresponding shadow copies of the one or more directory data fragment nodes associated with the deleted directory's root node and marking for deletion the corresponding shadow copies (e.g., leaf nodes 606', 607' of FIG. 6D). After the deleted directory root node is deleted, the update intent may be removed from the corresponding deleted directory root parent node.

The garbage collection process may be implemented as a background process by the storage system to remove from a file system metadata snapshot tree the metadata associated with one or more deleted directories and their associated subdirectories and/or files. The garbage collection process may be implemented when the storage system has available system resources. The storage system may allocate resources for garbage collection when resources for other higher priority operations, such as backup, replication, restore, migration, etc., are not as in demand.

The garbage collection process may comprise the storage system scanning a leaf level of the file system metadata snapshot tree corresponding to an incremental backup snapshot to determine one or more nodes that were previously marked for deletion. For the one or more nodes that were previously marked for deletion, the storage system may determine whether the one or more nodes that were marked for deletion are associated with any descendant nodes by reading one or more directory data fragment nodes that are associated with the one or more nodes that were previously marked for deletion. In the event the one or more nodes that were previously marked for deletion are associated with one or more descendant nodes, the one or more descendant nodes are marked for deletion in a manner described herein, and the one or more nodes that were previously marked for deletion are deleted. In the event the one or more nodes that were previously marked for deletion are not associated with one or more descendant nodes, the one or more nodes that were previously marked for deletion are deleted. The storage system recursively performs this process until the one or more nodes that are marked for deletion are not associated with any descendant nodes.

In some instances, a file system metadata snapshot tree corresponding to an incremental backup snapshot is cloned (e.g., copied) before the garbage collection process has finished deleting the one or more nodes marked for deletion and their descendant nodes, if any. For example, the primary system may have performed a subsequent backup snapshot before the garbage collection process is finished deleting the one or more nodes marked for deletion and their descendant nodes associated with a previous backup snapshot. Since a file system metadata snapshot tree corresponding to subsequent backup snapshots includes nodes of a file system metadata snapshot tree corresponding to a previous backup snapshot, the one or more nodes marked for deletion and their descendant nodes, if any, are propagated to a file system metadata snapshot tree corresponding to a subsequent backup snapshot.

For efficiency purposes and to reduce the likelihood that the one or more nodes marked for deletion and their descendant nodes, if any, are propagated to one or more future file system metadata snapshot trees corresponding to one or more subsequent backup snapshots, the storage system may prioritize, during the garbage collection process, a latest file system metadata snapshot tree of the plurality of file system metadata snapshot trees that include the one or more nodes marked for deletion and their descendant nodes, if any, over earlier file system metadata snapshot trees that include the one or more nodes marked for deletion and their descendant nodes, if any. The storage system may identify the latest file system metadata snapshot tree by identifying a node marked for deletion and performing a bottom-up file system metadata snapshot tree walk of the plurality of file system metadata snapshot trees that include the node marked for deletion to determine a plurality of root nodes that indirectly reference the node marked for deletion.

A bottom-up tree walk of the file system metadata snapshot trees may include scanning a leaf level (e.g., level 0) of the file system metadata snapshot trees to identify a node marked for deletion and scanning a next level (e.g., level 1) of the file system metadata snapshot trees to identify a first set of one or more nodes that directly reference the node marked for deletion. The bottom-up tree walk may further include scanning a next level (e.g., level 2) of the file system metadata snapshot trees to identify a second set of one or more nodes that directly reference the first set of one or more nodes that directly reference the node marked for deletion. This process continues until a top level of the file system metadata snapshot trees are scanned to identify root nodes of the file system metadata snapshot trees that indirectly reference (e.g., through the nodes identified at each level) the node marked for deletion. Each of the determined root nodes is associated with a corresponding timestamp (e.g., a time at which a backup snapshot is performed). The latest file system metadata snapshot tree may be determined based on the timestamps associated with the determined root nodes (e.g., the root node with the latest timestamp). Upon determining the latest file system metadata snapshot tree, the storage system may prioritize, during the garbage collection process, performing garbage collection with respect to the latest file system metadata snapshot tree over older file system metadata snapshot trees. This may prevent the one or more nodes marked for deletion and their descendant nodes, if any, from being propagated to one or more future file system metadata snapshot trees corresponding to subsequent backup snapshots before one or more subsequent file system metadata snapshot trees are generated. For example, if a file system metadata snapshot tree associated with a subsequent backup is generated before all the nodes marked for deletion (and their descendent nodes, if any) are deleted, the marked but undeleted nodes may be propagated to the subsequent backup; however, because the root nodes of the file system metadata snapshot tree that reference the marked but undeleted nodes have been unlinked, navigation to the marked but undeleted nodes will be interrupted.

FIG. 1 is a block diagram illustrating a system for performing asynchronous deletion of large directories. The asynchronous deletion of large directories includes an unlinking process and a garbage collection process. In the example shown, system 100 is comprised of primary system 102 and storage system 112. Primary system 102 is coupled to storage system 112 via connection 110. Connection 110 may be a wired or wireless connection. Connection 110 may be a LAN, WAN, intranet, the Internet, and/or a combination thereof.

Primary system 102 is a computing system that stores file system data. The file system data may include a plurality of files (e.g., content files, text files, etc.) and metadata associated with the plurality of files. In some embodiments, primary system 102 includes one or more workloads (e.g., virtual machine, container, pod, database, etc.). The file system data may include data associated with the one or more workloads. Primary system 102 may be comprised of one or more servers, one or more computing devices, one or more storage devices, and/or a combination thereof. Primary system 102 is configured to organize the file system data using file directory tree structure 103.

File directory tree structure 103 may be comprised of a root node, one or more levels of one or more intermediate nodes, and a plurality of leaf nodes. A node of the file directory tree structure may correspond to a directory, a sub-directory, or a file. Each node of file directory tree structure 103 has a corresponding inode. An inode is a data structure that describes a file system object, such as a file, directory, or sub-directory. A directory inode may store a pointer to one or more other inodes.

A backup snapshot may be received by storage system 112. For example, primary system 102 may be configured to send a backup snapshot of its file system data to storage system 112 according to one or more backup snapshot policies. In some embodiments, a backup snapshot policy indicates that file system data is to be backed up on a periodic basis (e.g., hourly, daily, weekly, monthly, etc.), when a threshold size of data has changed, or in response to a command from a user associated with primary system 102.

Backup agent 104 may be configured to cause primary system 102 to perform a backup snapshot (e.g., a full backup snapshot or incremental backup snapshot). A full backup snapshot may include all of the file system data of primary system 102 at a particular moment in time. In some embodiments, primary system 102 includes a backup function and is configured to perform a backup snapshot on its own without backup agent 104. In some embodiments, storage system 112 may provide instructions to primary system 102, causing primary system 102 to execute backup functions without the backup agent 104. In some embodiments, storage system 112 may capture a backup snapshot by accessing file system data from primary system 102. In some embodiments, an incremental backup snapshot captures a state of primary system 102 where some of the file system data has been deleted, modified, and/or added since a previous backup snapshot. The backup snapshot may include an indication of the file system data that was deleted, modified, and/or added since a previous backup snapshot.

In some embodiments, file directory tree structure 103 is walked prior to performing a backup snapshot to determine the amount of data associated with file directory tree structure 103. Storage system 112 may use a distributed file system protocol (e.g., network file system) to access and walk file directory tree structure 103. When an incremental backup snapshot is to be performed, file directory tree structure 103 may be walked and a current number of files and/or directories associated with file directory tree structure 103 may be compared to a previous number of files and/or directories associated with file directory tree structure 103. In some embodiments, a full backup snapshot may be performed instead of an incremental backup snapshot in the event the difference between the current number of files and/or directories associated with file directory tree structure 103 and the previous number of files and/or directories associated with file directory tree structure 103 is greater than a threshold (size-based threshold or number of file-based threshold), even though an incremental backup snapshot is scheduled to be performed because the amount of time needed to perform the full backup snapshot and generate a file system metadata snapshot tree corresponding to the full backup snapshot is less than the amount of time needed to perform the incremental backup snapshot and to generate a file system metadata snapshot tree corresponding to the incremental backup snapshot.

Storage system 112 is comprised of a storage cluster that includes a plurality of storage nodes 111, 113, 115. Although three storage nodes are shown, storage system 112 may be comprised of n storage nodes. The plurality of storage nodes may be comprised of one or more solid state drives, one or more hard disk drives, or a combination thereof. Each storage node may have its own corresponding processor. Storage system 112 may be configured to ingest a backup snapshot received from primary system 102 and may be configured to store the data associated with the backup snapshot across the storage cluster. Storage system 112 may be a cloud instantiation of a storage system. A configuration of a cloud instantiation of storage system 112 may be a virtual replica of storage system 112. For example, storage system 112 may be comprised of three storage nodes, each storage node with a storage capacity of 10 TB. A cloud instantiation of storage system 112 may be comprised of three virtual nodes, each virtual node with a storage capacity of 10 TB. In other embodiments, a cloud instantiation of storage system 112 may have more storage capacity than storage system 112. In other embodiments, a cloud instantiation of storage system 112 may have less storage capacity than storage system 112.

Storage system 112 may include a file system manager 117 that is configured to organize the file system data of the backup snapshot using a tree data structure. The tree data structures generated by file system manager 117 may be stored in metadata store 114. An example of the tree data structure is a file system metadata snapshot tree, which may be based on a B+ tree structure (or other type of tree structure in other embodiments). A leaf node of the file system metadata snapshot tree may be configured to store a key-value pair of metadata, such as child ID, inode ID. The key-value pairs of metadata may be stored in a key-value store (KVS) that is stored in metadata store 114. Storage system 112 may be configured to store the KVS across the plurality of storage nodes. The key-value pairs of the KVS may be grouped into a plurality of buckets. Each storage node of the plurality of storage nodes includes a local KVS that stores a portion of the KVS, i.e., at least one of the plurality of buckets. When storage system 112 performs a garbage collection process, a storage node may be assigned to one or more buckets of the KVS and perform the garbage collection process, as disclosed herein, to the key-value pairs included in the one or more assigned buckets. This enables storage system 112 to distribute the garbage collection process. Instead of having a single storage node perform the garbage collection process, using a plurality of storage nodes to perform the garbage collection process in parallel reduces the amount of time needed to perform the garbage collection process.

In the event data is generated on or by storage system 112, a view corresponding to the data generated on or by the storage system 112 may be comprised of a file system metadata snapshot tree and one or more metadata structures. The file system metadata snapshot tree may be configured to store the metadata of the data generated on or by the storage system. A metadata structure may be configured to store the metadata associated with a file included in the data generated on or by storage system 112.

The tree data structure may be used to capture different views of data. A view of data may correspond to a full backup snapshot, an incremental backup snapshot, a clone of data, a file, etc. The tree data structure allows a chain of file system metadata snapshot trees to be linked together (e.g., "a file system metadata snapshot forest") by allowing a node of a later version of a file system metadata snapshot tree to reference a node of a previous version of a file system metadata snapshot tree. The previous version of the file system metadata snapshot tree may correspond to an earlier backup snapshot. For example, a root node or an intermediate node of a file system metadata snapshot tree corresponding to a second backup snapshot may reference an intermediate node or leaf node of a file system metadata snapshot tree corresponding to a first backup snapshot.

A file system metadata snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a content file that is less than or equal to a limit size (e.g., 256 kB), an identifier of a data brick, one or more pointers to one or more metadata structures (e.g., Blob structure), a pointer to a data chunk stored on the storage system, a pointer to another leaf node, inode metadata, etc.

In some embodiments, a leaf node of the file system metadata snapshot tree corresponds to an inode of file directory tree structure 103. A leaf node that corresponds to a directory inode may include a pointer to a leaf node that corresponds to a directory data fragment associated with the inode. The directory data fragment may store one or more entries. Each of the one or more entries may store a child ID (e.g., file name, directory name, sub-directory name) and an inode ID. For example, a parent inode of file directory tree structure 103 of primary system 102 may include a first pointer to a first child inode, a second pointer to a second child inode, and a third pointer to a third child inode. The file system metadata snapshot tree may include a leaf node that corresponds to the parent inode, a leaf node that corresponds to the first child inode, a leaf node that corresponds to the second child inode, a leaf node that corresponds to the third child inode, and a directory data fragment leaf node that is associated with the parent inode. The directory data fragment leaf node that is associated with the parent inode may store a first entry that identifies a first child and an identifier of the first child inode, a second entry that identifies a second child and an identifier of the second child inode, and a third entry that identifies a third child and an identifier of the third child inode. The leaf node that corresponds to the parent inode stores a pointer to the directory data fragment leaf node that is associated with the parent inode. The directory data fragment leaf node that is associated with the parent inode stores a first pointer to the leaf node corresponding to the first child inode, a second pointer to the leaf node corresponding to the second child inode, and a third pointer to the leaf node corresponding to the third child inode.

A leaf node of a file system metadata snapshot tree may include a pointer to a metadata structure. A metadata structure is configured to store the metadata associated with a content file, metadata associated with a workload (container, pod, virtual machine, database, etc.), etc. A metadata structure (e.g., file metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of a content file to be linked together by allowing a node of a later version of a metadata structure to reference a node of a previous version of a metadata structure.

A leaf node of a metadata structure may store a value, such as an identifier of a data brick associated with one or more data chunks. The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

After a previous backup snapshot, some of the file system data of primary system 102 may be deleted. For example, a directory and all of its sub-directories and files of file directory tree structure 103 may have been deleted. An incremental backup snapshot of primary system 102 may be subsequently performed. The incremental backup snapshot of primary system 102 may include metadata that indicates the file system data associated with primary system 102 that has been deleted since the previous snapshot.

Storage system 112 is configured to generate a view of the file system data that corresponds to the incremental backup snapshot by cloning a file system metadata snapshot tree corresponding to a previous backup snapshot and removing, from the cloned file system metadata snapshot tree, references to nodes associated with the file system metadata snapshot tree corresponding to a previous backup snapshot that correspond to the file system data that was deleted since the previous backup snapshot. For example, a directory and its sub-directories and/or files may have been deleted in between the previous backup snapshot and the incremental backup snapshot. A file system metadata snapshot tree associated with the previous backup snapshot may include a deleted directory root parent node, a deleted directory root node, and a directory data fragment node that is associated with the deleted directory root parent node. The directory data fragment node that is associated with the deleted directory root parent node includes an entry that references the deleted directory. In the event the directory and its subdirectories and/or files have been deleted in between the previous backup snapshot and the incremental backup snapshot, storage system 112 is configured to represent this deletion by unlinking the deleted directory root node from the deleted directory root parent node.

File system manager 117 may unlink the deleted directory root node from the deleted directory root parent node by updating the deleted directory root parent node to include an update intent that references a node that is to be deleted, updating the deleted directory root node to include an update intent that indicates the node is to be deleted, and removing from a directory data fragment node that is associated with the deleted directory root parent node an entry that corresponds to the deleted directory. Modifying the deleted directory root node and the deleted directory root parent node to include corresponding update intents enables storage system 112 to resume the unlinking process in the event the storage system crashes during the unlinking process.

File system manager 117 may update the deleted directory root parent node to include an update intent that references a node that is to be deleted by performing a shadow copy of the deleted directory root parent node. The shadow copy of the deleted directory root parent node (e.g., leaf node 605' of FIG. 6B) initially stores the same information as the deleted directory root parent node. File system manager 117 updates the shadow copy of the deleted directory root parent node to include an update intent that references a node that is to be deleted.

File system manager 117 may update the deleted directory root node to include an update intent that indicates the node is to be deleted by performing a shadow copy of the deleted directory root node. The shadow copy of the deleted directory root node (e.g., leaf node 605' of FIG. 6B) initially stores the same information as the deleted directory root node. File system manager 117 updates the shadow copy of the deleted directory root node to include an update intent that indicates the node is to be deleted.

The directory data fragment node that is associated with the deleted directory root parent node (e.g., leaf node 604 of FIG. 6B) is configured to store one or more entries. File system manager 117 may remove from the directory data fragment node that is associated with the deleted directory root parent node an entry that corresponds to the deleted directory by performing a shadow copy of the directory data fragment node that is associated with the deleted directory root parent node. The shadow copy of the directory data fragment node associated with the deleted directory root parent node (e.g., leaf node 604' of FIG. 6C) initially includes the same entries as the directory data fragment node associated with the deleted directory root parent node. File system manager 117 updates the shadow copy of the directory data fragment node associated with the deleted directory root parent node by removing the entry that corresponds to the deleted directory. This prevents a user from using the file system metadata snapshot tree corresponding to the incremental backup snapshot to access the deleted directory and any subdirectories or files associated with the deleted directory.

Storage system 112 may enable the file system metadata snapshot tree corresponding to the incremental backup snapshot to be accessible after one or more deleted directory root nodes of the file system metadata snapshot tree corresponding to the incremental backup snapshot are unlinked from their corresponding deleted directory root parent nodes of the file system metadata snapshot tree corresponding to the incremental backup snapshot.

A deleted directory root node of the file system metadata snapshot tree corresponding to the incremental backup snapshot may be associated with one or more directory data fragment nodes. Each directory data fragment node may store a plurality of entries. An entry may correspond to a file stored in the directory or a sub-directory of the directory. In some embodiments, the maximum number of entries stored by a directory data fragment node is 256 entries.

During a garbage collection process, file system manager 117 may mark for deletion the one or more directory data fragments of the deleted directory root node and then delete the directory root node. The one or more directory data fragments nodes that are associated with the deleted directory root node (e.g., leaf nodes 606, 607 of FIG. 6C) may be marked for deletion by performing corresponding shadow copies of the one or more directory data fragment nodes associated with the deleted directory's root node (e.g., leaf nodes 606', 607' of FIG. 6D) and marking for deletion the corresponding shadow copies. The corresponding shadow copies of the one or more directory data fragment nodes associated with the deleted directory's root node store the same entries as the one or more directory data fragment nodes associated with the deleted directory's root node. After the deleted directory's root node is deleted, file system manager 117 may remove the update intent from the corresponding deleted directory root parent node.

File system manager 117 may implement a garbage collection process as a background process to remove from a file system metadata snapshot tree, the metadata associated with one or more deleted directories and their associated subdirectories and/or files. File system manager 117 may implement the garbage collection process when storage system 112 has available resources. Storage system 112 may allocate resources for garbage collection when resources for other higher priority operations, such as backup, replication, restore, migration, etc., are not as in demand.

The garbage collection process may further comprise file system manager 117 scanning a leaf level of the file system metadata snapshot tree corresponding to an incremental backup snapshot to determine one or more nodes that were previously marked for deletion. For the one or more nodes that were previously marked for deletion, file system manager 117 may determine whether the one or more nodes that were previously marked for deletion are associated with any descendant nodes by reading one or more directory data fragments nodes that are associated with the one or more nodes that were previously marked for deletion. In the event the one or more nodes that were previously marked for deletion are associated with one or more descendant nodes, file system manager 117 marks for deletion, in a manner described herein, the one or more descendant nodes and deletes the one or more nodes that were previously marked for deletion. In the event the one or more nodes that were previously marked for deletion are not associated with one or more descendant nodes, file system manager 117 deletes the one or more nodes that were previously marked for deletion. File system manager 117 recursively performs this process until the one or more nodes that are marked for deletion are not associated with any descendant nodes.

In some instances, a file system metadata snapshot tree corresponding to an incremental backup snapshot is cloned before a garbage collection process performed by file system manager 117 has finished deleting the one or more nodes marked for deletion and their descendant nodes, if any. For example, primary system 102 may have performed a subsequent backup snapshot before file system manger 117 is finished with deleting the one or more nodes marked for deletion and their descendant nodes associated with a previous backup snapshot. Since a file system metadata snapshot tree corresponding to subsequent backup snapshots includes nodes of a file system metadata snapshot tree corresponding to a previous backup snapshot, the one or more nodes marked for deletion and their descendant nodes, if any, are propagated to a file system metadata snapshot tree corresponding to a subsequent backup snapshot.

For efficiency purposes and to reduce the likelihood that the one or more nodes marked for deletion and their descendant nodes, if any, are propagated to one or more future file system metadata snapshot trees corresponding to subsequent backup snapshots, file system manager 117 may prioritize, during the garbage collection process, a latest file system metadata snapshot tree that includes the one or more nodes marked for deletion and their descendant nodes, if any, over earlier file system metadata snapshot trees that include the one or more nodes marked for deletion and their descendant nodes, if any. File system manager 117 may identify the latest file system metadata snapshot tree by identifying a node marked for deletion and performing a bottom-up file system metadata snapshot tree walk of a plurality of file system metadata snapshot trees that include the node marked for deletion to determine a plurality of root nodes that indirectly reference the node marked for deletion.

A bottom-up tree walk of the file system metadata snapshot trees may include scanning a leaf level (e.g., level 0) of the file system metadata snapshot trees to identify the node marked for deletion and scanning a next level (e.g., level 1) of the file system metadata snapshot trees to identify a first set of one or more metadata objects that directly reference the node marked for deletion. The bottom-up tree walk may further include scanning a next level (e.g., level 2) of the file system metadata snapshot trees to identify a second set of one or more metadata objects that directly reference the first set of one or more metadata objects that directly reference the node marked for deletion. This process continues until a top level of the file system metadata snapshot trees is scanned to identify root nodes of the file system metadata snapshot trees that indirectly reference (e.g., through the metadata objects identified at each level) the node marked for deletion. Each of the determined root nodes is associated with a corresponding timestamp (e.g., a time at which a backup snapshot is performed). File system manager 117 may determine the latest file system metadata snapshot tree based on the timestamps associated with the determined root nodes.

Figure 2A:
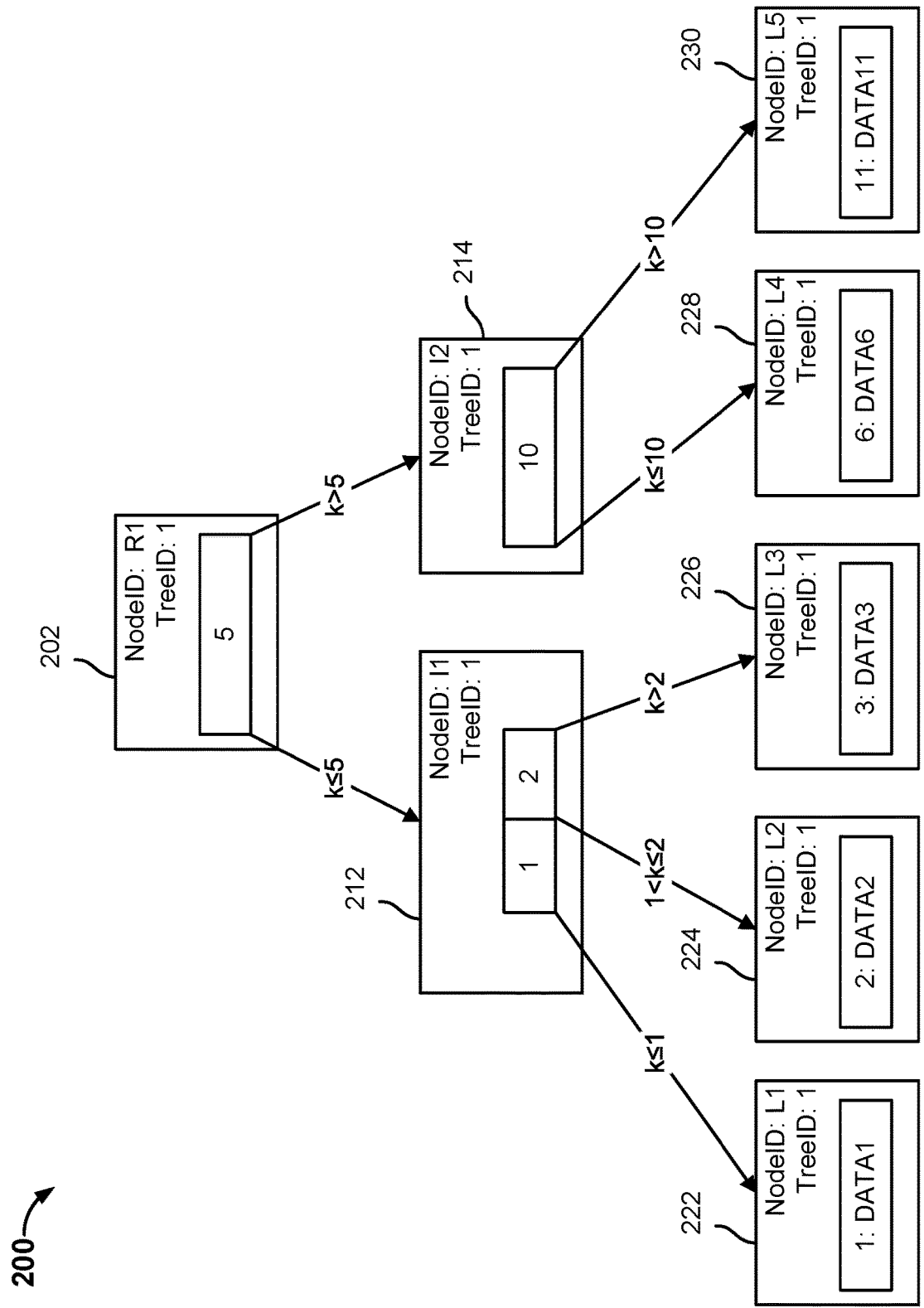
FIG. 2A is a block diagram illustrating an embodiment of a tree data structure.

FIG. 2A is a block diagram illustrating an embodiment of a tree data structure. A tree data structure may be used to represent a view of file system data that is stored on a storage system, such as storage system 112. The file system data may include metadata for a distributed file system and may include information, such as chunk identifier, chunk offset, file size, directory structure, file permissions, physical storage locations of the content files, inode information, etc. A file system manager, such as file system manager 117, may generate tree data structure 200. Tree data structure 200 may correspond to a full backup snapshot.

Tree data structure 200 is comprised of a file system metadata snapshot tree that includes root node 202, intermediate nodes 212, 214, and leaf nodes 222, 224, 226, 228, 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time, for example, at time to. The backup snapshot may be received from a primary system, such as primary system 102. The file system metadata snapshot tree in conjunction with a plurality of metadata structures may provide a complete view of the primary system associated with the backup snapshot for the particular point in time. A node of tree data structure 200 may be referred to as a "metadata object."

A root node is the starting point of a file system metadata snapshot tree and may include pointers to one or more other nodes. An intermediate node is a node to which another node points (e.g., root node, other intermediate node) and includes one or more pointers to one or more other nodes. A leaf node is a node of the file system metadata snapshot tree at the lowest level of the file system metadata snapshot tree. Each node of the tree structure includes a view identifier of a view with which the node is associated (e.g., TreeID). A leaf node may be configured to store key-value pairs of file system data. A data key k is a lookup value by which a particular leaf node may be accessed. For example, "1" is a data key that may be used to lookup "DATA1" of leaf node 222.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "5." To find a leaf node storing a value associated with a data key of "6" or "11," the second branch of root node 202 would be traversed to intermediate node 214 because data keys "6" and "11" are greater than the node key of "5."

A data key k of a key-value pair is not limited to a numerical value. In some embodiments, non-numerical data keys may be used for a data key-value pair (e.g., "name," "age," etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 202 includes pointers to intermediate node 212 and intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "6" or "11" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1," "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "6" or "11."

Intermediate node 212 includes pointers to leaf nodes 222, 224, 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes pointers to leaf nodes 228, 230. Intermediate node 212 includes a NodeID of "I2" and a TreeID of "1." Intermediate node 214 includes a node key of "10." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "6." The pointer to leaf node 230 indicates that traversing tree data structure 200 from intermediate node 214 to leaf node 230 will lead to the node with a data key of "11."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata. In other embodiments, leaf node 222 is configured to store content file data when the size of the content file is less than or equal to a limit size. In other embodiments, leaf node 222 corresponds to a directory inode and is configured to store a pointer to a directory data fragment. In other embodiments, leaf node 222 is a directory data fragment and is configured to store one or more entries. Each entry corresponds to an inode to which the directory inode of a primary system pointed. In other embodiments, leaf node 222 corresponds to a file inode and is configured to store a pointer to or an identifier of a metadata structure (e.g., file metadata structure, file metadata tree).

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata. In other embodiments, leaf node 224 is configured to store content file data when the size of the content file is less than or equal to a limit size. In other embodiments, leaf node 224 corresponds to a directory inode and is configured to store a pointer to a directory data fragment. In other embodiments, leaf node 224 is a directory data fragment and is configured to store one or more entries. Each entry corresponds to an inode to which the directory inode of a primary system pointed. In other embodiments, leaf node 224 corresponds to a file inode and is configured to store a pointer to or an identifier of a metadata structure (e.g., file metadata structure, file metadata tree).

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata. In other embodiments, leaf node 226 is configured to store content file data when the size of the content file is less than or equal to a limit size. In other embodiments, leaf node 226 corresponds to a directory inode and is configured to store a pointer to a directory data fragment. In other embodiments, leaf node 226 is a directory data fragment and is configured to store one or more entries. Each entry corresponds to an inode to which the directory inode of a primary system pointed. In other embodiments, leaf node 226 corresponds to a file inode and is configured to store a pointer to or an identifier of a metadata structure (e.g., file metadata structure, file metadata tree).

Leaf node 228 includes a data key-value pair of "6: DATA6." Leaf node 228 includes NodeID of "L4" and a TreeID of "1." To view the value associated with a data key of "6," tree data structure 200 is traversed from root node 202 to intermediate node 214 to leaf node 228. In some embodiments, leaf node 228 is configured to store metadata. In other embodiments, leaf node 228 is configured to store content file data when the size of the content file is less than or equal to a limit size. In other embodiments, leaf node 228 corresponds to a directory inode and is configured to store a pointer to a directory data fragment. In other embodiments, leaf node 228 is a directory data fragment and is configured to store one or more entries. Each entry corresponds to an inode to which the directory inode of a primary system pointed. In other embodiments, leaf node 228 corresponds to a file inode and is configured to store a pointer to or an identifier of a metadata structure (e.g., file metadata structure, file metadata tree).

Leaf node 230 includes a data key-value pair of "11: DATA11." Leaf node 230 includes NodeID of "L5" and a TreeID of "1." To view the value associated with a data key of "11," tree data structure 200 is traversed from root node 202 to intermediate node 214 to leaf node 230. In some embodiments, leaf node 230 is configured to store metadata. In other embodiments, leaf node 230 is configured to store content file data when the size of the content file is less than or equal to a limit size. In other embodiments, leaf node 230 corresponds to a directory inode and is configured to store a pointer to a directory data fragment. In other embodiments, leaf node 230 is a directory data fragment and is configured to store one or more entries. Each entry corresponds to an inode to which the directory inode of a primary system pointed. In other embodiments, leaf node 230 corresponds to a file inode and is configured to store a pointer to or an identifier of a metadata structure (e.g., file metadata structure, file metadata tree).

Figure 2B:
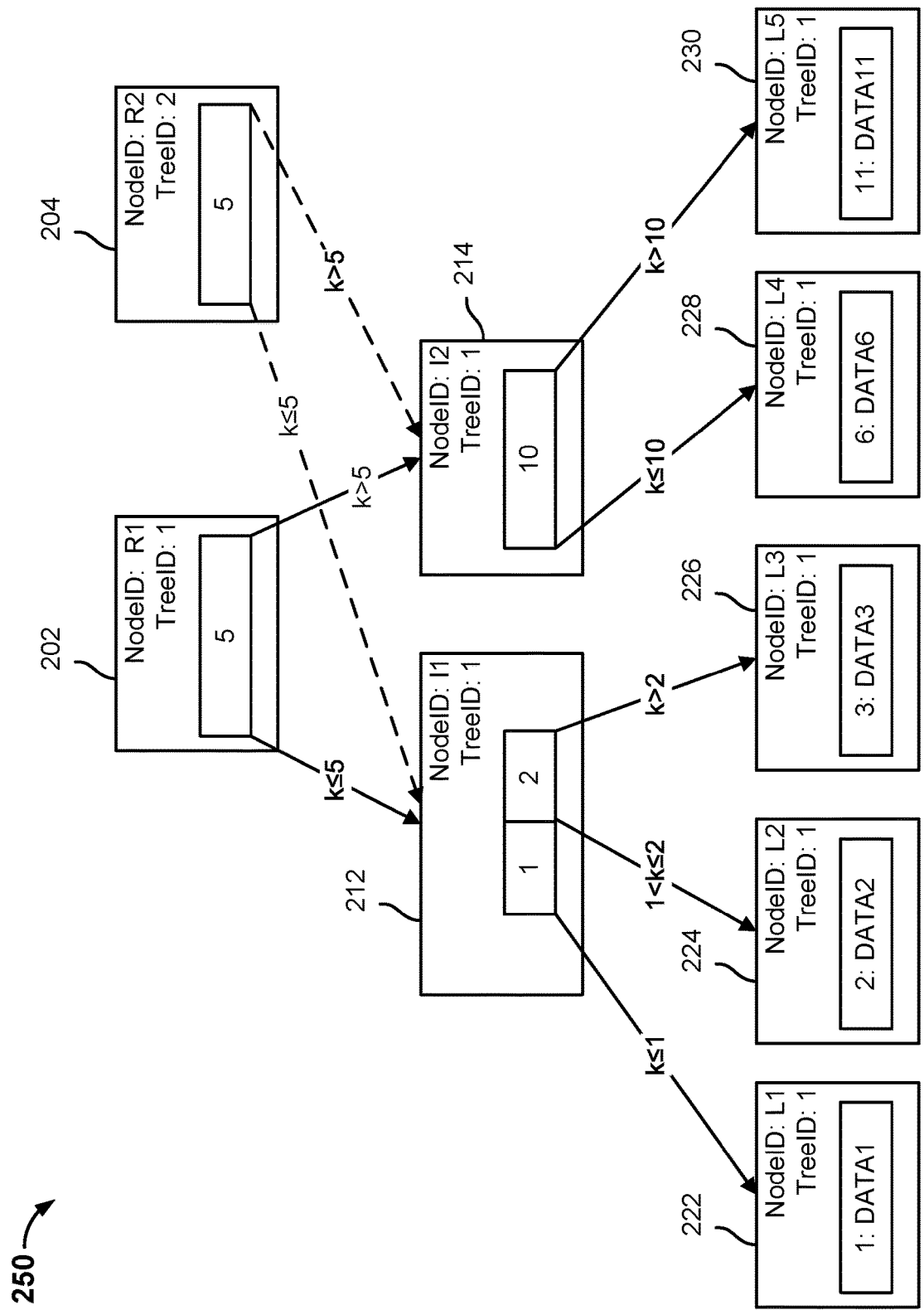
FIG. 2B is a block diagram illustrating an embodiment of a cloned file system metadata snapshot tree.

FIG. 2B is a block diagram illustrating an embodiment of a cloned file system metadata snapshot tree. A file system metadata snapshot tree may be cloned when a file system metadata snapshot tree is added to a tree data structure (e.g., when an incremental backup snapshot is performed), when data associated with a file system metadata snapshot tree is migrated, when data associated with a file system metadata snapshot tree is restored, when data associated with a file system metadata snapshot tree is replicated, when data associated with a file system metadata snapshot tree is used for test/development purposes, etc. In some embodiments, tree data structure 250 may be created by a storage system, such as storage system 112. The file system data of a primary system, such as primary system 102, may be backed up to a storage system, such as storage system 112. A subsequent backup snapshot may correspond to an incremental backup snapshot. The tree data structure corresponding to the subsequent backup snapshot is generated in part by cloning a file system metadata snapshot tree associated with a previous backup snapshot.

In the example shown, tree data structure 250 includes root nodes 202, 204, intermediate nodes 212, 214, and leaf nodes 222, 224, 226, 228, and 230. Tree data structure 250 can be used to capture different versions of file system data at different moments in time. A tree data structure may also efficiently locate desired metadata by traversing a particular version of a snapshot tree included in the tree data structure. In some embodiments, the tree data structure allows a chain of backup snapshot versions (i.e., file system metadata snapshot forest) to be linked together by allowing a node of a later version of a file system metadata snapshot tree to reference a node of a previous version of a file system metadata snapshot tree. For example, a file system metadata snapshot tree with root node 204 is linked to a file system metadata snapshot tree with root node 202. Each time a backup snapshot is performed, a new root node may be created and the new root node includes the same set of pointers included in the previous root node, that is the new root node of the snapshot may be linked to one or more intermediate nodes associated with a previous snapshot. The new root node also includes a different NodeID and a different TreeID.

In some embodiments, a root node is associated with a current view of the file system data. A current view may still accept one or more changes to the data. In the example shown, root node 204 is associated with a current view of the file system data. In other embodiments, a root node is associated with a snapshot view of the file system data. A snapshot view may represent a state of the file system data at a particular moment in time in the past and is not updated. In the example shown, root node 202 is associated with a snapshot view of the file system data.

To generate a file system metadata snapshot tree corresponding to an incremental backup snapshot at $t_1$, root node 202 is cloned, i.e., copied. In the example shown, root node 204 is a copy of root node 202. Similar to root node 202, root node 204 includes the same pointers as root node 202, but includes a different NodeID and a different TreeID. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "6" or "11." Root node 204 includes a NodeID of "R2" and a TreeID of "2."

Figure 2C:
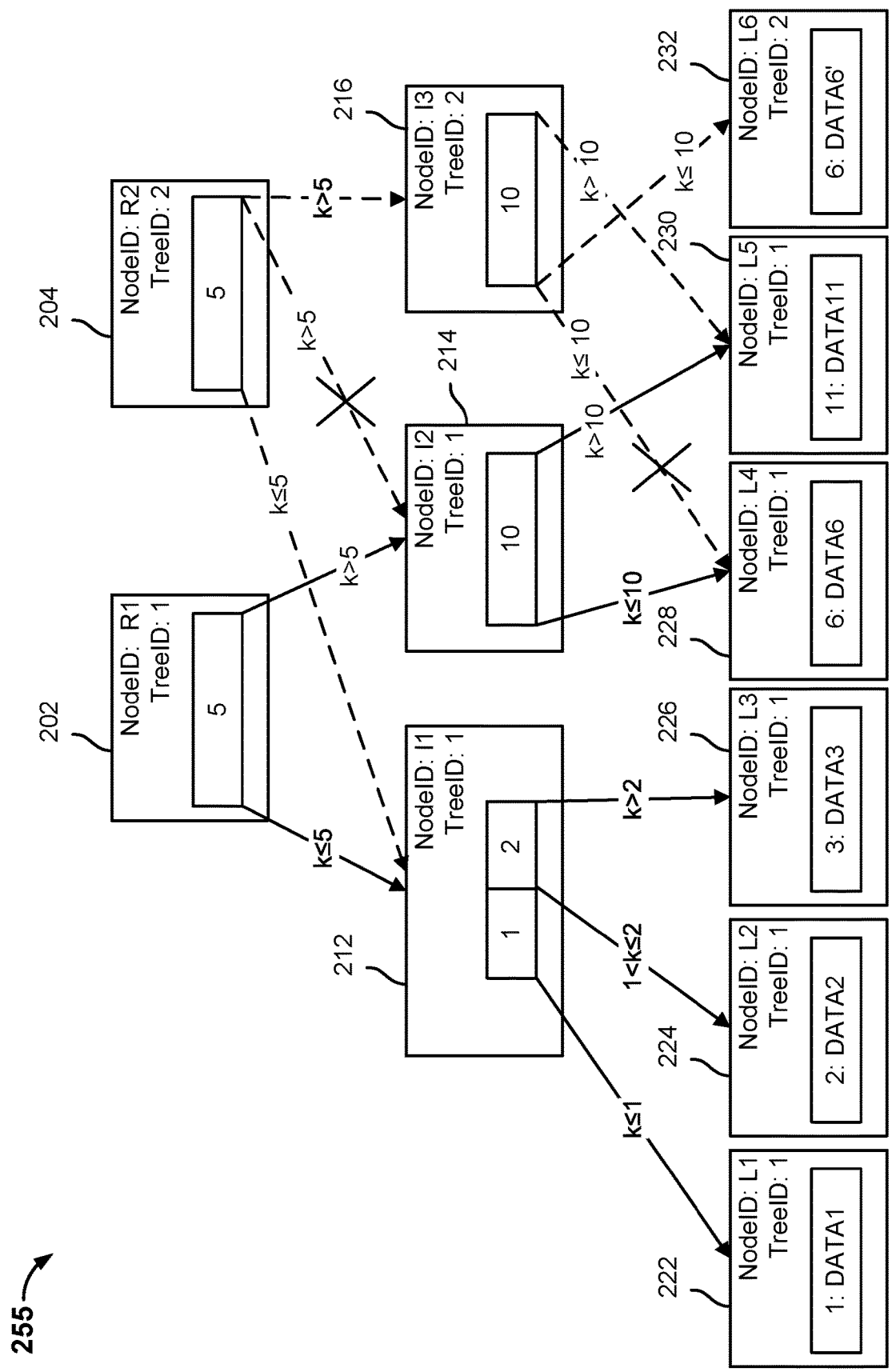
FIG. 2C is a block diagram illustrating an embodiment of modifying a cloned file system metadata snapshot tree.

FIG. 2C is a block diagram illustrating an embodiment of modifying a cloned file system metadata snapshot tree. In the example shown, tree data structure 255 may be modified by a file system manager, such as file system manager 117. A file system metadata snapshot tree with a root node 204 may be a current view of the file system data, for example, at time $t_1$.

In the example shown, the value "DATA6" has been modified to be "DATA6'". In some embodiments, the value of a key value pair has been modified. For example, the value of the key value pair may be modified such that it includes an intent marker. In some embodiments, the intent marker indicates that the leaf node is to be deleted. In some embodiments, the intent marker indicates that the leaf node references a node that is to be deleted. In other embodiments, the value of the key value pair is the file data associated with a content file that is smaller than or equal to a limit size. In other embodiments, the value of the key value pair points to a different metadata structure (e.g., a metadata structure corresponding to a different version of a file). The different metadata structure may be a modified version of the metadata structure to which the leaf node previously pointed. In some embodiments, the value of the key value pair no longer points to another node to which the node pointed.

To modify the file system metadata snapshot tree at $t_1$, the file system manager starts at root node 204 because that is the root node associated with the file system metadata snapshot tree at time $t_1$. The value "DATA6" is associated with the data key "6." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made.

A shadow copy of a node is performed when the node is included in a plurality of file system metadata snapshot trees (e.g., the file system metadata snapshot tree with root node 202 and the file system metadata snapshot tree with root node 204) and a value stored by the node has been updated between backup snapshots. The value stored by a node that is associated with a file system metadata snapshot tree that corresponds to a previous backup snapshot is immutable. The shadow copy of the node enables a value stored by a node to be updated because the shadow copy of the node is not shared with one or more file system metadata snapshot trees that correspond to one or more previous backup snapshots, rather, the shadow copy of the node is associated with the file system metadata snapshot tree that corresponds to the incremental backup snapshot (a latest backup snapshot).

A shadow copy is a copy of a node and includes the same pointers as the copied node, but includes a different NodeID and TreeID. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228, i.e., a shadow copy. Leaf node copy 232 stores the modified value "DATA6'" and includes the same TreeID as root node 204. The file system manager updates a pointer of intermediate node 216 to point to leaf node 232 instead of pointing to leaf node 228. In some embodiments, leaf node 232 stores the value of a key value pair that has been modified. In other embodiments, leaf node 232 stores the modified data associated with a content file that is smaller than or equal to a limit size.

In some embodiments, leaf node 228 corresponds to a deleted directory root parent node. Leaf node 232 corresponds to a shadow copy of leaf node 228 and is updated to store an update intent that references a node that is to be deleted. Leaf node 226 may include a pointer (not shown) to leaf node 228. After the shadow copy is performed, the pointer of leaf node 226 may be updated to reference leaf node 232 instead of referencing leaf node 228. Leaf node 228 may include a pointer (not shown) to leaf node 230. After the shadow copy is performed, leaf node 232 may also include a pointer (not shown) to leaf node 230.

In some embodiments, leaf node 228 corresponds to a root of a deleted directory. Leaf node 232 corresponds to a shadow copy of leaf node 228 and is updated to store an update intent that indicates the node is to be deleted. Leaf node 226 may include a pointer (not shown) to leaf node 228. After the shadow copy is performed, the pointer of leaf node 226 may be updated to reference leaf node 232 instead of referencing leaf node 228. Leaf node 228 may include a pointer (not shown) to leaf node 230. After the shadow copy is performed, leaf node 232 may also include a pointer (not shown) to leaf node 230.

In some embodiments, leaf node 228 corresponds to a directory data fragment and stores an entry that corresponds to a deleted directory. Leaf node 230 may correspond to the root of a deleted directory. Leaf node 228 may include a pointer (not shown) to leaf node 230. Leaf node 232 corresponds to a shadow copy of leaf node 228 and initially includes an entry that corresponds to the deleted directory and a pointer to leaf node 230. Leaf node 232 may be updated such that the entry that corresponds to the deleted directory is removed from leaf node 232 and leaf node 232 no longer includes a pointer to leaf node 230. Leaf node 226 may include a pointer (not shown) to leaf node 228. After the shadow copy is performed, the pointer of leaf node 226 may be updated to reference leaf node 232 instead of referencing leaf node 228.

Figure 2D:
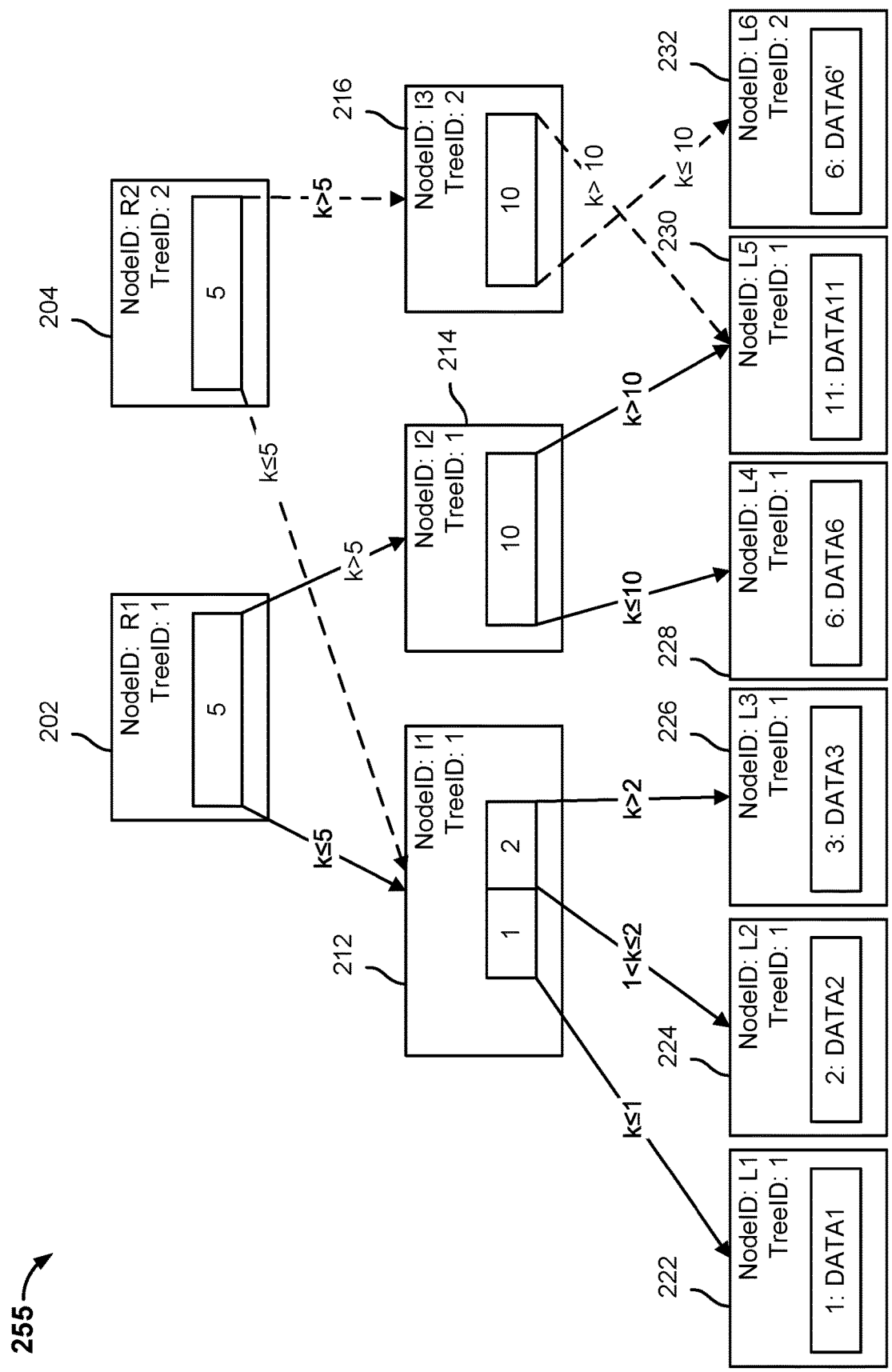
FIG. 2D is a block diagram illustrating an embodiment of a modified file system metadata snapshot tree.

FIG. 2D is a block diagram illustrating an embodiment of a modified file system metadata snapshot tree. Tree data structure 255 shown in FIG. 2D illustrates a result of the modifications made to a file system metadata snapshot tree as described with respect to FIG. 2C.

Figure 3A:
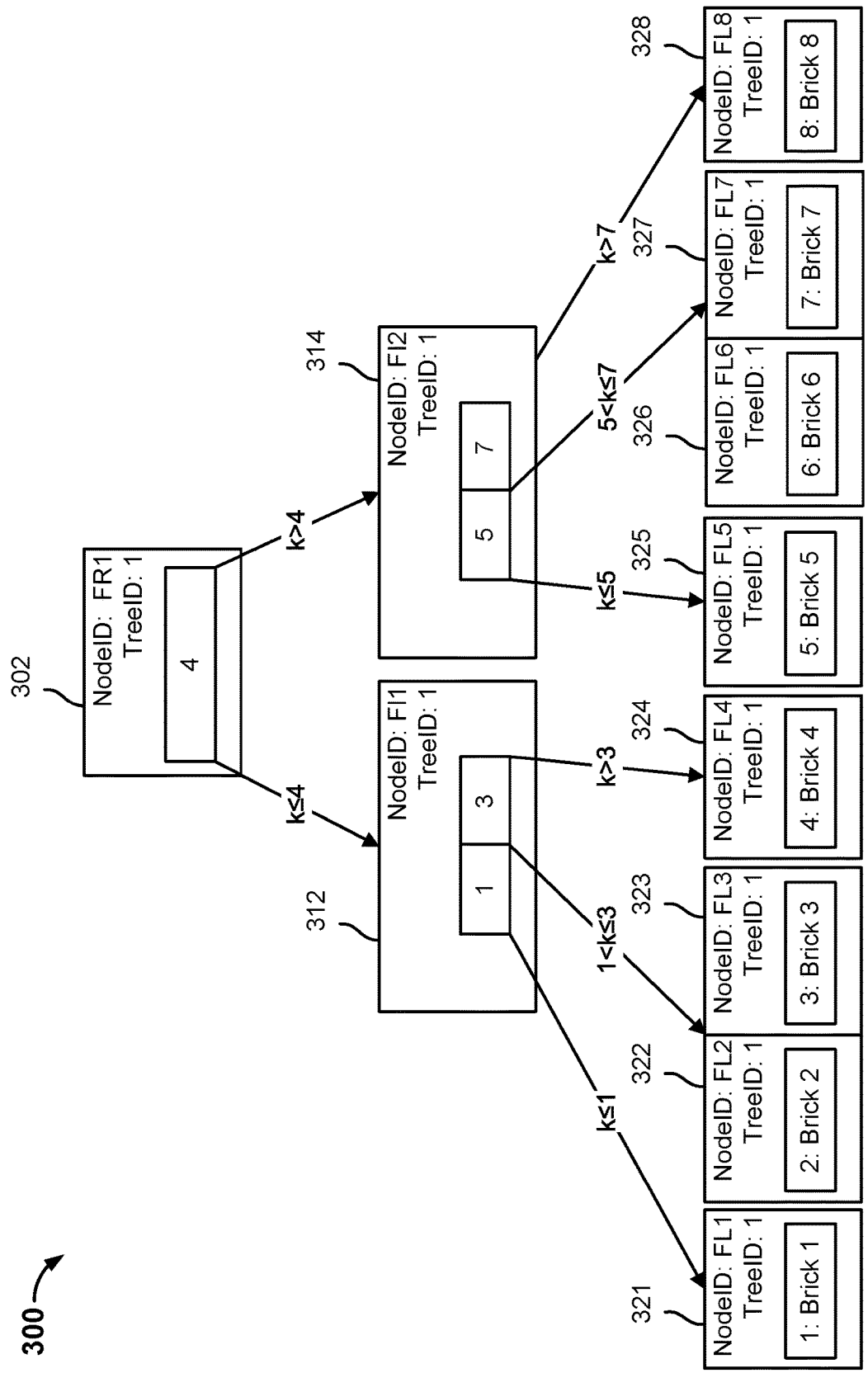
FIG. 3A is a block diagram illustrating an embodiment of a tree data structure.

FIG. 3A is a block diagram illustrating an embodiment of a tree data structure. In some embodiments, tree data structure 300 may be created by a storage system, such as storage system 112. Tree data structure 300 may be used to store the metadata associated with a file metadata structure. In the example shown, tree data structure 300 corresponds to a content file and stores the file metadata associated with the content file. The file metadata associated with a content file may be stored by a storage system separate from the contents of the file, that is, tree data structure storing the file metadata associated with a content file is stored separately from the contents of the content file. For example, the contents of the file may be stored on a hard disk drive, while tree data structure 300 that holds the file metadata may be stored in storage with faster access times, such as a solid state drive (SSD) of a storage node.

A leaf node of a file system metadata snapshot tree associated with file system data, such as a leaf node of tree data structures 200, 250, 255, may include a pointer to a tree data structure that stores metadata corresponding to a content file, such as tree data structure 300. A tree data structure corresponding to a content file and storing the file metadata associated with the content file is a snapshot tree, but is used to organize the data chunks associated with a content file (e.g., data components) that are stored on the storage system. A file metadata structure may be referred to as a file metadata tree.

A tree data structure corresponding to a content file at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time to. Tree data structure 300 may correspond to a full backup of a content file.

In the example shown, tree data structure 300 includes file root node 302, file intermediate nodes 312, 314, and file leaf nodes 321, 322, 323, 324, 325, 326, 327, 328. Similar to the snapshot trees described above, each node includes a "NodeID" that identifies the node and a "TreeID" that identifies a view with which the node is associated (e.g., a version of the content file). Root node 302 includes pointers to intermediate nodes 312, 314. Root node 302 includes a NodeID of "FR1" and a TreeID of "1."

In the example shown, intermediate node 312 includes respective pointers to leaf nodes 321, 322, 323, 324. Intermediate node 312 includes a NodeID of "FI1" and a TreeID of "1." Intermediate node 312 includes a first node key and a second node key. The data key k for leaf node 321 is a value that is less than or equal to the first node key. The data key for leaf nodes 322, 323 is a value that is greater than the first node key and less than or equal to the second node key. The data key for leaf node 324 is a value that is greater than the second node key. The pointer to leaf node 321 indicates that traversing tree data structure 300 from intermediate node 312 to leaf node 321 will lead to the node with a data key of "1." The pointer to leaf node 322 indicates that traversing tree data structure 300 from intermediate node 312 to leaf node 322 will lead to the node with a data key of "2." The pointer to leaf node 323 indicates that traversing tree data structure 300 from intermediate node 312 to leaf node 323 will lead to the node with a data key of "3." The pointer to leaf node 324 indicates that traversing tree data structure 300 from intermediate node 312 to leaf node 324 will lead to the node with a data key of "4."

In the example shown, intermediate node 314 includes respective pointers to leaf nodes 325, 326, 327, 328. Intermediate node 314 includes a NodeID of "FI2" and a TreeID of "1." Intermediate node 314 includes a first node key and a second node key.

The data key k for leaf node 325 is a value that is less than or equal to the first node key. The data key for leaf nodes 326, 327 is a value that is greater than the first node key and less than or equal to the second node key. The data key for leaf node 328 is a value that is greater than the second node key. The pointer to leaf node 325 indicates that traversing tree data structure 300 from intermediate node 314 to leaf node 325 will lead to the node with a data key of "5." The pointer to leaf node 326 indicates that traversing tree data structure 300 from intermediate node 314 to leaf node 326 will lead to the node with a data key of "6." The pointer to leaf node 327 indicates that traversing tree data structure 300 from intermediate node 314 to leaf node 327 will lead to the node with a data key of "7." The pointer to leaf node 328 indicates that traversing tree data structure 300 from intermediate node 314 to leaf node 328 will lead to the node with a data key of "8."

Leaf node 321 includes a data key-value pair of "1: Brick 1." "Brick 1" is a brick identifier that identifies the data brick associated with one or more data chunks of a content file corresponding to tree data structure 300. Leaf node 321 includes NodeID of "FL1" and a TreeID of "1."

Leaf node 322 includes a data key-value pair of "2: Brick 2." "Brick 2" is a brick identifier that identifies the data brick associated with one or more data chunks of a content file corresponding to tree data structure 300. Leaf node 322 includes NodeID of "FL2" and a TreeID of "1." In this example, both leaf nodes 322, 323 have a key value that is less than or equal to 3 and greater than 1. A file system manager may traverse to leaf node 322 or leaf node 323 based on the corresponding key associated with leaf node 322 and leaf node 323. For example, the file system manager may receive a request to return the value associated with a data key "2." In response to the request, the file system manager may traverse tree data structure 300 to leaf node 322. A file system manager may receive a request to return the value associated with a data key "3." In response to the request, the file system manager may traverse tree data structure 300 to leaf node 323.

Leaf node 323 includes a data key-value pair of "3: Brick 3." "Brick 3" is a brick identifier that identifies the data brick associated with one or more data chunks of a content file corresponding to tree data structure 300. Leaf node 323 includes NodeID of "FL3" and a TreeID of "1."

Leaf node 324 includes a data key-value pair of "4: Brick 4." "Brick 4" is a brick identifier that identifies the data brick associated with one or more data chunks of a content file corresponding to tree data structure 300. Leaf node 324 includes NodeID of "FL4" and a TreeID of "1."

Leaf node 325 includes a data key-value pair of "5: Brick 5." "Brick 5" is a brick identifier that identifies the data brick associated with one or more data chunks of a content file corresponding to tree data structure 300. Leaf node 325 includes NodeID of "FL5" and a TreeID of "1."

Leaf node 326 includes a data key-value pair of "6: Brick 6." "Brick 6" is a brick identifier that identifies the data brick associated with one or more data chunks of a content file corresponding to tree data structure 300. Leaf node 326 includes NodeID of "FL6" and a TreeID of "1." In this example, both leaf nodes 326, 327 have a key value that is less than or equal to 7 and greater than 5. A file system manager may traverse tree data structure 300 to leaf node 326 or leaf node 327 based on the corresponding key associated with leaf node 326 and leaf node 327. For example, the file system manager may receive a request to return the value associated with a data key "6." In response to the request, the file system manager may traverse tree data structure 300 to leaf node 326. The file system manager may receive a request to return the value associated with a data key "7." In response to the request, the file system manager may traverse tree data structure 300 to leaf node 327.

Leaf node 327 includes a data key-value pair of "7: Brick 7." "Brick 7" is a brick identifier that identifies the data brick associated with one or more data chunks of a content file corresponding to tree data structure 300. Leaf node 327 includes NodeID of "FL7" and a TreeID of "1."

Leaf node 328 includes a data key-value pair of "8: Brick 8." "Brick 8" is a brick identifier that identifies the data brick associated with one or more data chunks of a content file corresponding to tree data structure 300. Leaf node 328 includes NodeID of "FL8" and a TreeID of "1."

A content file may be comprised of a plurality of data chunks. A brick may be associated with one or more data chunks. In the example shown, leaf nodes 321, 322, 323, 324, 325, 326, 327, 328 each store a corresponding brick identifier. A metadata store, such as metadata store 114, may include one or more data structures that associate a brick identifier with one or more corresponding chunk identifiers and a corresponding location (physical location) of the one or more data chunks associated with the one or more corresponding chunk identifiers. For example, a metadata store may store a first data structure (e.g., chunk metadata table) that is configured to associate brick identifiers with chunk identifiers and chunk file identifiers. The metadata store may store a second data structure (e.g., chunk file metadata table) that associates a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 3B:
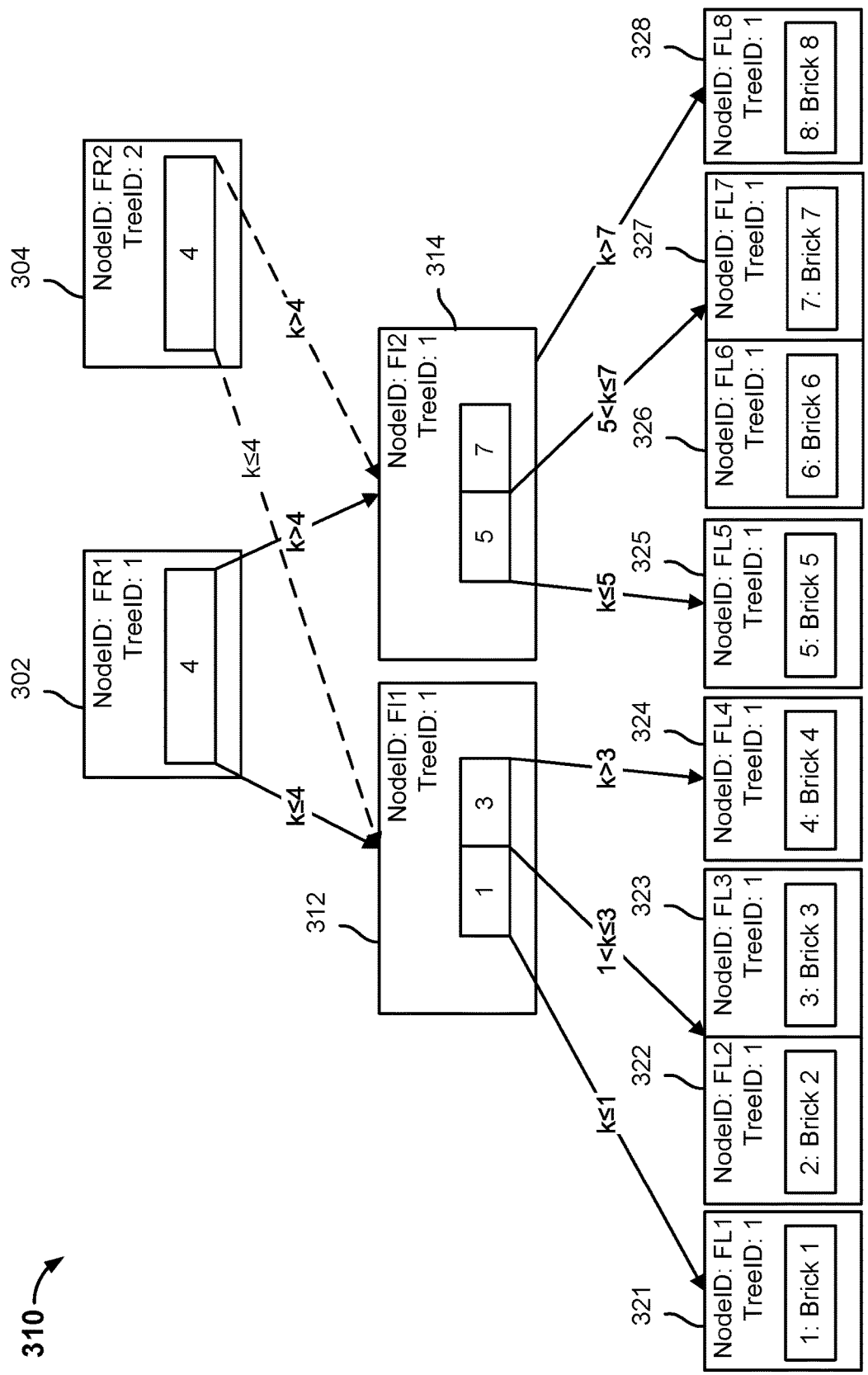
FIG. 3B is a block diagram illustrating an embodiment of a cloned metadata structure.

FIG. 3B is a block diagram illustrating an embodiment of a cloned metadata structure. A metadata structure may be cloned when a subsequent version of a content file or a workload is stored on a storage system. In some embodiments, tree data structure 310 may be created by a storage system, such as storage system 112. In the example shown, tree data structure 310 corresponds to a content file that is a snapshot tree, but stores file metadata associated with the content file. The tree data structure corresponding to a content file can be used to capture different versions of a content file at different moments in time. In some embodiments, the tree data structure allows a chain of metadata structures corresponding to different versions of a content file to be linked together by allowing a node of a later version of a metadata structure to reference a node of a previous version of a metadata structure. The metadata structure corresponding to a subsequent version of a content file may be generated in part by cloning the metadata structure corresponding to a previous version of a content file.

A root node or an intermediate node of a version of a metadata structure may reference an intermediate node or a leaf node of a previous version of a metadata structure. Similar to the file system metadata snapshot tree, the metadata structure allows different versions of a content file to share nodes and allows changes to a content file to be tracked. When a backup snapshot is received, a root node of the metadata structure may be linked to one or more intermediate nodes associated with a previous metadata structure. This may occur when data associated with a content file is included in both backup snapshots.

In the example shown, tree data structure 310 includes a first metadata structure comprising root node 302, intermediate nodes 312, 314, and leaf nodes 321, 322, 323, 324, 325, 326, 327, 328. Tree data structure 310 also includes a second metadata structure that may be a snapshot of file data at a particular point in time, for example at time $t_1$. The second metadata structure is comprised of root node 304, intermediate nodes 312, 314, and leaf nodes 321, 322, 323, 324, 325, 326, 327, 328. To create a snapshot of the file data at time $t_1$, a new root node is created by cloning the previous root node. The cloned root node includes the same set of pointers as the previous root node, but includes a different NodeID and a different TreeID. In the example shown, root node 304 includes a set of pointers to intermediate nodes 312, 314, which are intermediate nodes associated with a previous snapshot. The TreeID is the view identifier associated with a view of the metadata structure at a particular moment in time. The TreeID of a root node indicates a view with which the root node is associated (e.g., content file version). For example, root node 302 with a TreeID of "1" is associated with a first backup snapshot and root node 304 with a TreeID of "2" is associated with a second backup snapshot.

In the example shown, root node 304 is a clone (i.e., a copy) of root node 302. Similar to root node 302, root node 304 includes the same pointers as root node 302. Root node 304 includes a first set of pointers to intermediate node 312. The first set of pointers associated with a data key (e.g., "1," "2," "3," or "4") less than or equal to the node key indicates that traversing a metadata structure included in tree data structure 310 from root node 304 to intermediate node 312 leads to a leaf node with a data key of "1," "2," "3," or "4." Root node 304 includes a second set of pointers to intermediate node 314. The second set of pointers associated with a data key greater than the node key indicates that traversing a metadata structure included in tree data structure 310 from root node 304 to intermediate node 314 leads to a leaf node with a data key of "5," "6," "7," or "8." Root node 304 includes a NodeID of "FR2" and a TreeID of "2."

Figure 3C:
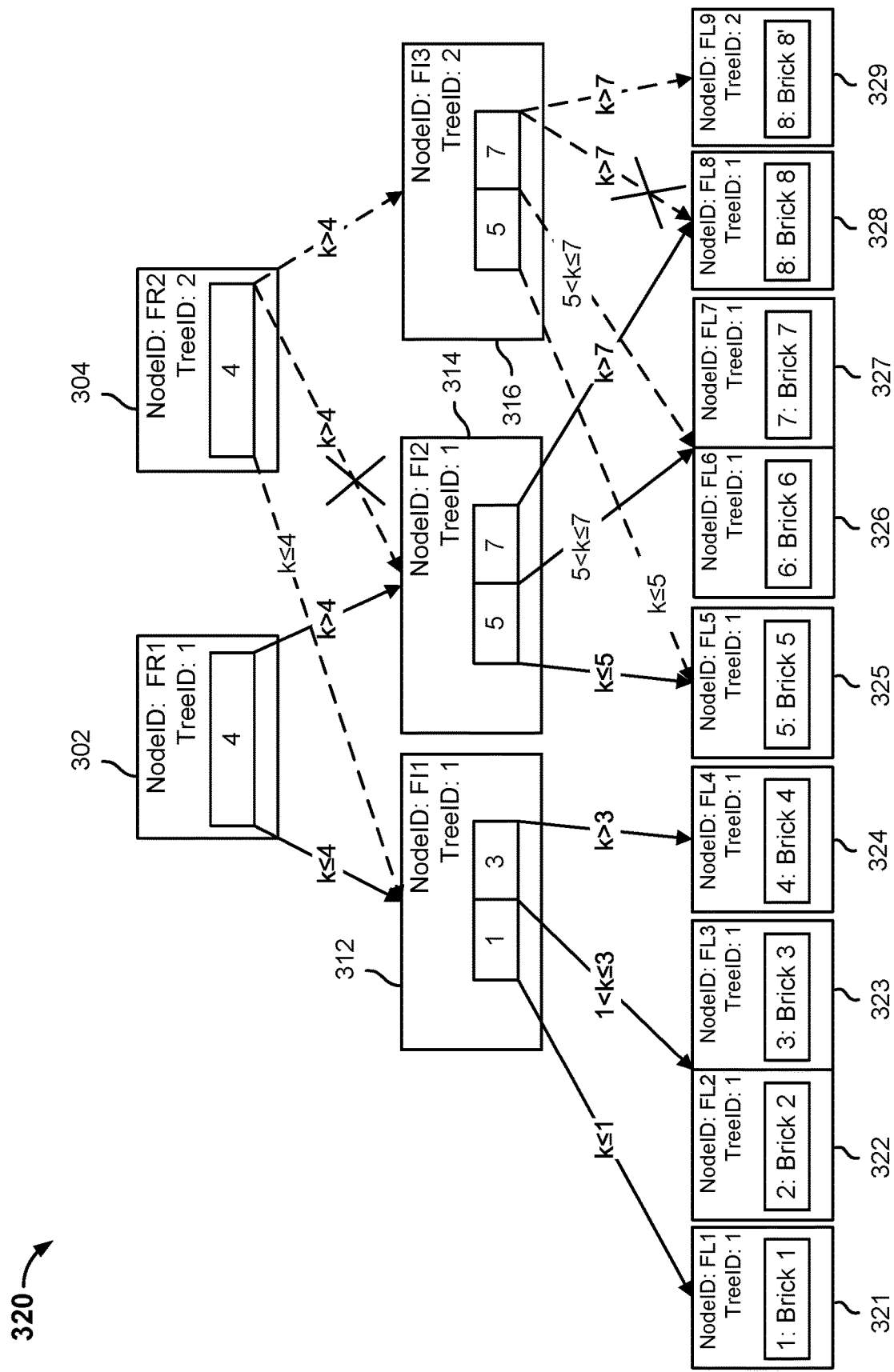
FIG. 3C is a block diagram illustrating an embodiment of modifying a cloned metadata structure.

FIG. 3C is a block diagram illustrating an embodiment of modifying a cloned metadata structure. Tree data structure 320 is comprised of a first metadata structure that includes root node 302 and a second metadata structure that includes root node 304. In the example shown, tree data structure 320 may be modified by a file system manager, such as file system manager 117.

In some embodiments, the file data associated with a content file may be modified such that one of the data chunks is replaced by another data chunk. When a data chunk of file data associated with a previous backup snapshot is replaced with a new data chunk, the data brick associated with the new data chunk may be different. A leaf node of a metadata structure stores a brick identifier of a data brick that is associated with a data chunk. To represent this modification to the file data, a corresponding modification is made to a current view of a metadata structure. The current view of the metadata structure is modified because the previous metadata structure is a snapshot view and can no longer be modified. The data chunk of the file data that was replaced has a corresponding leaf node in the previous metadata structure. A new leaf node in the current view of the metadata structure is created, as described herein, that corresponds to the new data chunk. The new leaf node includes an identifier associated with the current view. The new leaf node may also store the chunk identifier associated with the modified data chunk.

In the example shown, a data chunk associated with "Brick 8" has been modified. The data chunk associated with "Brick 8" has been replaced with a data chunk associated with "Brick 8'." At $t_1$, the file system manager starts at root node 304 because that is the root node associated with the metadata structure at time $t_1$. The value "Brick 8" is associated with the data key "8." The file system manager traverses tree data structure 320 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "8," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 320 from intermediate node 316 to leaf node 328, determines that the TreeID of leaf node 328 does not match the TreeID of root node 304, and creates a copy of leaf node 328. Leaf node 329 is a copy of leaf node 328, but stores the brick identifier "Brick 8'" and includes the same TreeID as root node 304. The file system manager updates a pointer of intermediate node 316 to point to leaf node 329 instead of pointing to leaf node 328.

Figure 3D:
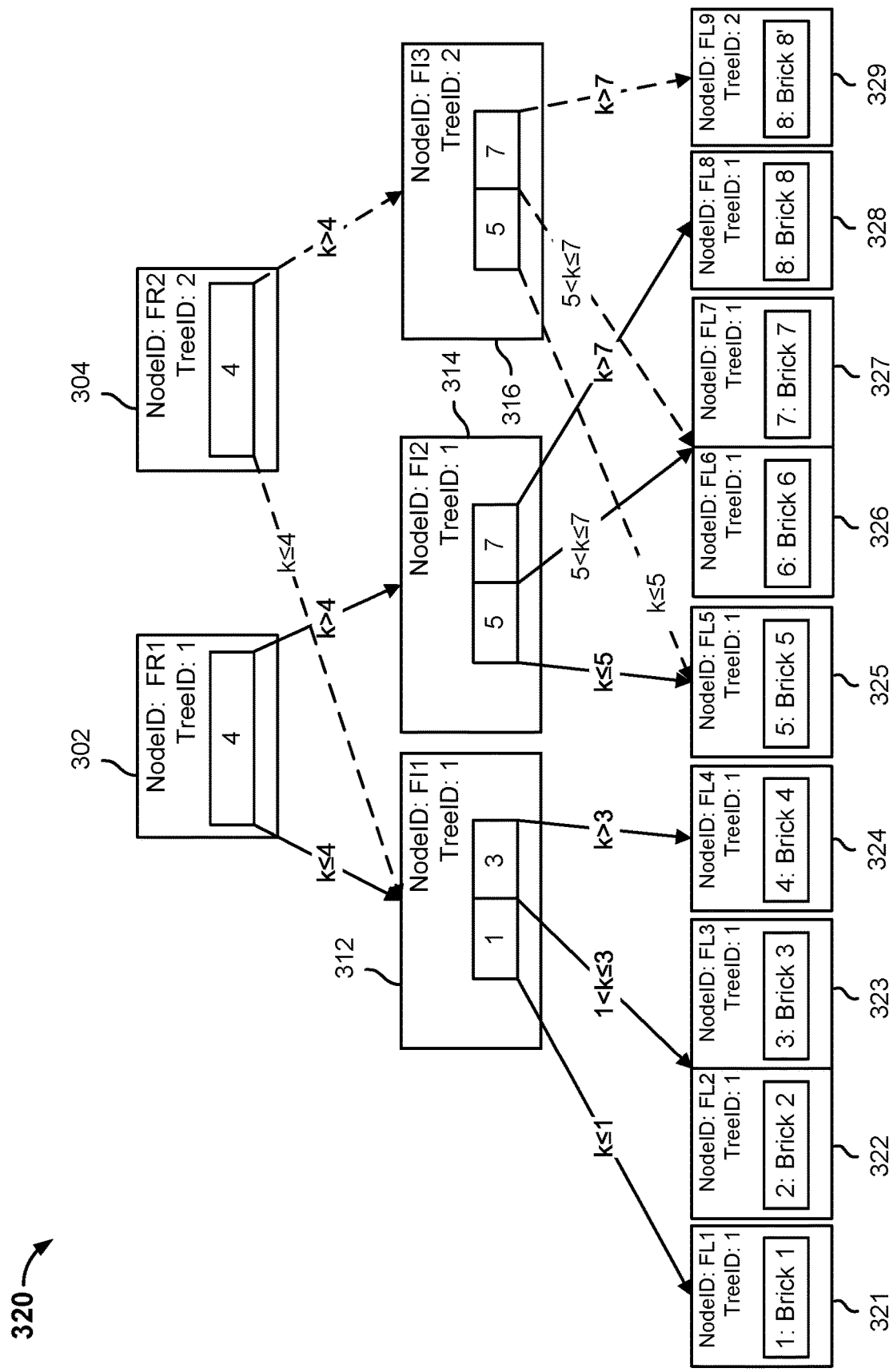
FIG. 3D is a block diagram illustrating an embodiment of a modified metadata structure.

FIG. 3D is a block diagram illustrating an embodiment of a modified metadata structure. The tree data structure 320 shown in FIG. 3D illustrates a result of the modifications made to tree data structure 320 as described with respect to FIG. 3C.

FIG. 4A is a diagram illustrating a data structure in accordance with some embodiments. Data structure 400 may be stored by a storage system, such as storage system 112, in a metadata store, such as metadata store 114. Data structure 400 may correspond to a chunk metadata table. In the example shown, data structure 400 stores the information associated with tree data structure 320. Data structure 400 stores information about the nodes included in tree data structure 320. For example, data structure 400 stores information about a node, such as "TreeID," "NodeID," "ChildrenID," "Ref Count," "Value," "ChunkID," and "Chunk FileID."

The "TreeID" value identifies a view of data to which the node is originally associated. For example, a view of data may be generated by a storage system. A "TreeID" of "1" indicates that a node was generated when the storage system generated a view of data associated with a "TreeID" of "1." The "NodeID" value identifies a name of a node. The "ChildrenID" value identifies the one or more children nodes to which the node points. The "Ref Count" value is a reference count that indicates a number of nodes that point to the node. The "Value" value is a value (e.g., brick identifier) stored by a leaf node. The "ChunkID" value is a chunk identifier associated with a brick identifier. The "Chunk FileID" value is a chunk file identifier that is associated with a chunk identifier.

A storage system may store a version of data structure 400 for each view generated by the storage system. In some embodiments, data structure 400 stores information for all of the views generated by the storage system.

A storage system may traverse data structure 400 to determine which data chunks are associated with a view of data. In the example shown, the storage system may traverse data structure 400 to determine that data chunks having chunk identifiers "SHA-$1_a$," "SHA-$1_b$," "SHA-$1_c$," "SHA-$1_d$," "SHA-$1_e$," "SHA-$1_f$," and "SHA-$1_g$" are associated with views having a "TreeID" of "1" and "2." The storage system may traverse data structure 400 to determine that the data chunk with the chunk identifier "SHA-$1_b$" is associated with view having a "TreeID" of "1." The storage system may traverse data structure 400 to determine that the data chunk with the chunk identifier "SHA-$1_i$" is associated with view having a "TreeID" of "2."

In the example shown, the storage system may traverse data structure 400 to determine that a view with a "TreeID" of "1" is associated with data chunks with the chunk identifiers "SHA-$1_a$," "SHA-$1_b$," "SHA-$1_c$," "SHA-$1_d$," "SHA-$1_e$," "SHA-$1_f$," "SHA-$1_g$," and "SHA-$1_h$." The storage system may traverse data structure 400 to determine that a view with a "TreeID" of "2" is associated with data chunks with the chunk identifiers "SHA-$1_a$," "SHA-$1_b$," "SHA-$1_c$," "SHA-$1_d$," "SHA-$1_e$," "SHA-$1_f$," "SHA-$1_g$," and "SHA-$1_i$."

FIG. 4B is a diagram illustrating a data structure in accordance with some embodiments. Data structure 450 may correspond to a chunk file metadata table. Data structure 450 may be stored in a metadata store, such as metadata store 114. In the example shown, data structure 450 is configured to associate a chunk file identifier with a chunk identifier, a chunk file offset, a storage node, and a primary owner.

A chunk file is comprised of a plurality of data chunks. Data structure 450 may indicate the plurality of data chunks associated with a chunk file. Data structure 450 may also indicate corresponding locations of the data chunks within the chunk file. For example, data structure 450 indicates that a chunk file having a chunk file identifier of "Chunk File 1" is comprised of at least a first data chunk having a chunk identifier of "SHA-$1_a$," a second data chunk having a chunk identifier of "SHA-$1_b$," a third data chunk having a chunk identifier of "SHA-$1_c$," and a fourth data chunk having a chunk identifier of "SHA-$1_d$." The first data chunk has a chunk file offset of "0-256 kb," the second data chunk has a chunk file offset of "256 kb-512 kb," the third data chunk has a chunk file offset of "512 kb-768 kb," and the fourth data chunk has a chunk file offset of "768 kb-1024 kb."

Data structure 450 indicates that a chunk file having a chunk file identifier of "Chunk File 2" is comprised of at least a first data chunk having a chunk identifier of "SHA-$1_e$," a second data chunk having a chunk identifier of "SHA-$1f$," a third data chunk having a chunk identifier of "SHA-$1_g$," and a fourth data chunk having a chunk identifier of "SHA-$1_h$." The first data chunk has a chunk file offset of "0-256 kb," the second data chunk has a chunk file offset of "256 kb 512 kb," the third data chunk has a chunk file offset of "512 kb-768 kb," and the fourth data chunk has a chunk file offset of "768 kb-1024 kb."

Data structure 450 indicates that a chunk file having a chunk file identifier of "Chunk File 3" is comprised of at least a first data chunk having a chunk identifier of "SHA-$1_i$." The first data chunk has a chunk file offset of "0-256 kb."

A storage system comprised of a plurality of storage nodes may store duplicate copies of a chunk file across the nodes. This may ensure access to the chunk file in the event a storage node of the storage system goes offline. In the example shown, a chunk file having a chunk file identifier of "Chunk File 1" is stored on storage node 1 and storage node 3, a chunk file having a chunk file identifier of "Chunk File 2" is stored on storage node 2 and storage node 4, and a chunk file having a chunk file identifier of "Chunk File 3" is stored on storage node 2 and storage node 3.

A chunk file may be associated with a primary owner. The primary owner may correspond to the original metadata structure that includes references to the data chunks included in the chunk file. For example, a primary system may perform a first backup snapshot that includes a first content file and send the data associated with the first content file to a storage system. The storage system may generate and store the data associated with the first content file in one or more chunk files. The storage system may generate a first metadata structure corresponding to the first content file. In other embodiments, the primary owner corresponds to the original content file that is associated with the chunk file.

The primary system may perform a second backup snapshot that includes a second content file and send the data associated with the second content file to the storage system. Some of the data associated with the second content file may already be stored on the storage system. Instead of generating a second chunk file for the duplicate data, the storage system may generate a second metadata structure corresponding to the second content file and the second metadata structure may include one or more references to the one or more chunk files associated with the first content file. The second file metadata structure may be considered to be a secondary owner. In the example shown, the metadata structure corresponding to "File 1" is the primary owner of chunk files 1, 2 and the metadata structure corresponding to "File 2" is the primary owner of chunk file 3.

A chunk file metadata table may associate portions of a chunk file with one or more secondary owners. For example, file 2 is a secondary owner of chunk file 1 having a file offset of 0-1024 kb and file 2 is a secondary owner of chunk file 2 having a file offset of 0-768 kb.

Figure 5A:
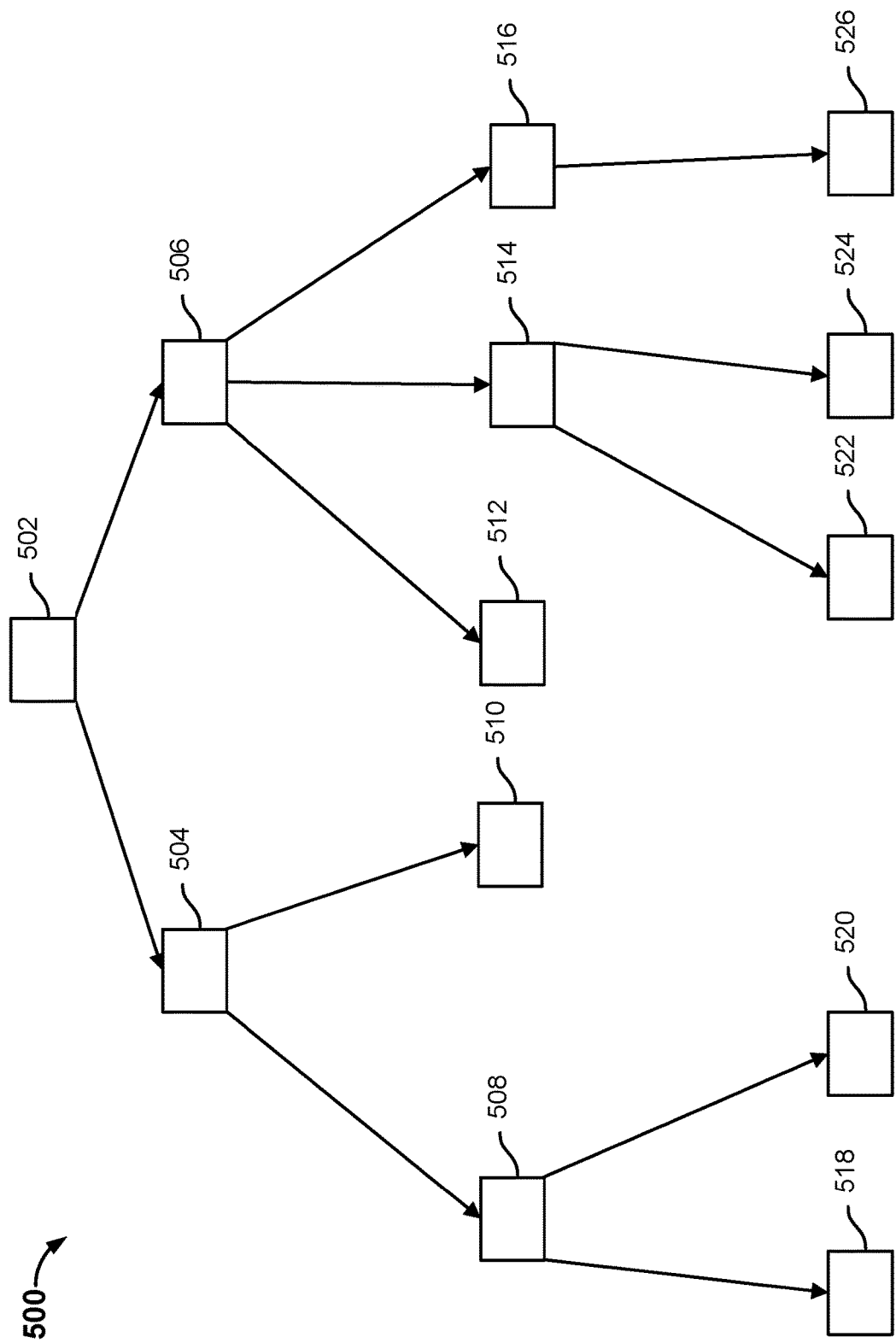
FIG. 5A is a diagram illustrating a file directory tree structure in accordance with some embodiments.

FIG. 5A is a diagram illustrating a file directory tree structure in accordance with some embodiments. In the example shown, file directory tree structure 500 may be generated by a primary system, such as primary system 102. A primary system may perform a backup snapshot of its filesystem data. The data associated with file directory tree structure 500 is included in the backup snapshot.

File directory tree structure 500 includes a plurality of inodes. An inode is a data structure that describes a file system object and may correspond to a file, a directory, or a sub-directory. An inode may store a pointer to another node. An inode may store a reverse pointer (e.g., the inode ID of a second inode that includes a pointer to the inode). In the example shown, the filesystem tree includes root directory inode 502, intermediate inodes 504, 506, 508, 514, 516, and leaf inodes 518, 520, 510, 512, 522, 524, 526.

Figure 5B:
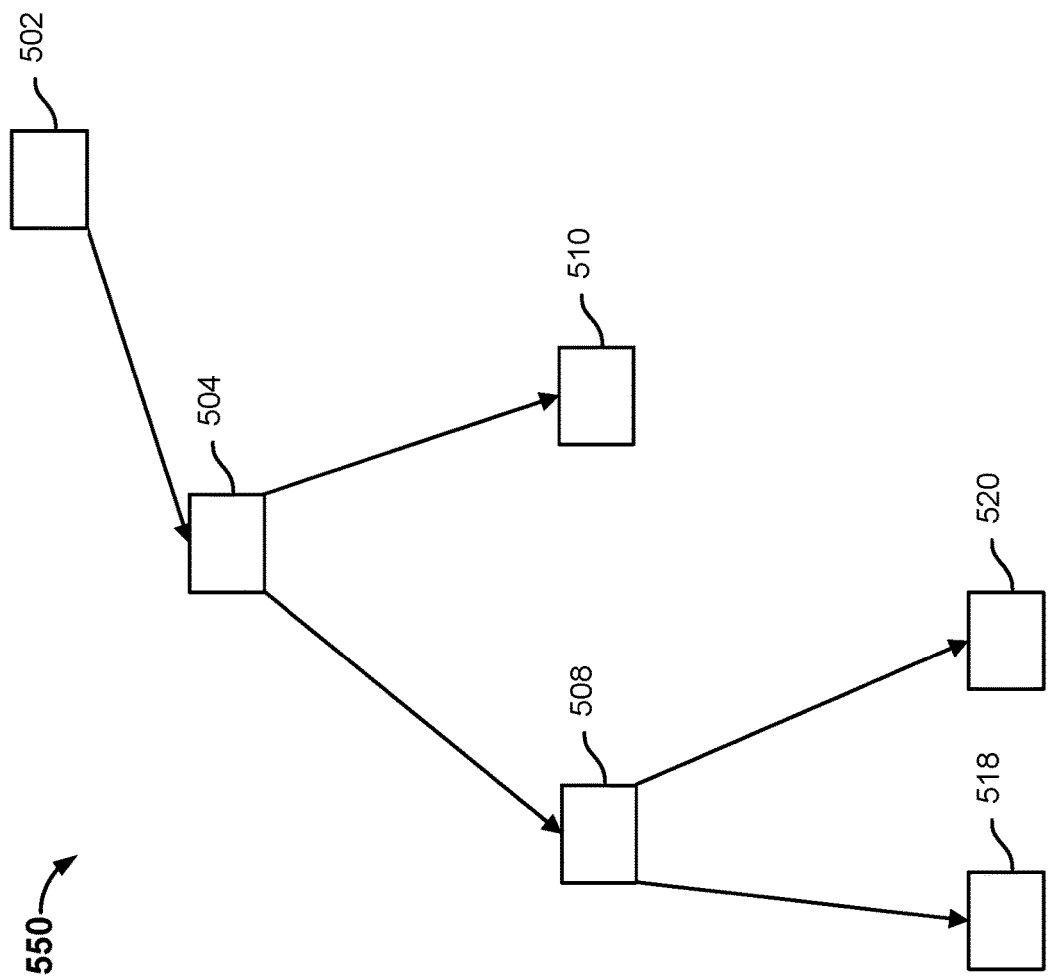
FIG. 5B is a diagram illustrating a file directory tree structure in accordance with some embodiments.

FIG. 5B is a diagram illustrating a file directory tree structure in accordance with some embodiments. In the example shown, file directory tree structure 550 may be generated by a primary system, such as primary system 102. A user associated with a primary system may delete a large portion of file directory tree structure 500 after a previous backup snapshot was performed.

In the example shown, inodes 506, 512, 514, 516, 522, 524, 526 were deleted after a previous backup snapshot of a primary system. The primary system may perform a subsequent backup snapshot, such as an incremental backup snapshot, and the subsequent backup snapshot includes data associated with file directory tree structure 550. For example, the data associated with file directory tree structure 550 may include the one or more inodes that were deleted since a previous backup snapshot.

FIG. 6A is a diagram illustrating a tree data structure in accordance with some embodiments. In the example shown, tree data structure 600 may be generated by a storage system, such as storage system 112.

Tree data structure 600 is comprised of file system metadata snapshot tree 601, file system metadata snapshot tree 602, and metadata structure 612. File system metadata snapshot tree 601 may correspond to a previous backup snapshot and file system metadata snapshot tree 602 may correspond to an incremental backup snapshot. File system metadata snapshot tree 601 may be cloned, as described with respect to FIG. 2B, when an incremental backup snapshot is performed.

Metadata structure 612 may store the metadata associated with a file. The metadata associated with the file may be used to locate the data associated with the file. In the example shown, file system metadata snapshot trees 601, 602 include leaf nodes 603, 604, 605, 606, 607, 608, 609. Although FIG. 6A illustrates file system metadata snapshot trees 601, 602 including seven leaf nodes, a file system metadata snapshot tree may include n leaf nodes. Each of the leaf nodes 603, 604, 605, 606, 607, 608, 609 is referenced by one of the intermediate nodes of file system metadata snapshot tree 602 (not shown). The nodes of a file system metadata snapshot tree, such as leaf nodes 603, 604, 605, 606, 607, 608, 609, may be referred to as "metadata objects."

Tree data structure 600 may be used to organize the file system data associated with a primary system that was included in a backup snapshot, such as the file directory tree structure of the primary system. A file directory tree structure of the primary system may include a root directory inode that includes a pointer to a first intermediate directory inode, a second intermediate directory inode, and a third intermediate directory inode. File system metadata snapshot tree 602 includes leaf node 603 that corresponds to the root directory inode (e.g., a "deleted directory root parent node"), leaf node 605 that corresponds to the first intermediate directory inode (e.g., a "deleted directory root node"), leaf node 608 that corresponds to the second intermediate directory inode, and leaf node 609 that corresponds to the third directory inode. File system metadata snapshot tree 602 includes directory data fragment nodes 604, 606, 607 that stores the inode relationship information between a directory inode and the inodes (directory, subdirectory, or file) to which the directory inode points. File system metadata snapshot tree 602 may include other leaf nodes that correspond to directories that are one level below the root directory, but are not shown for explanation purposes.

Leaf node 604 corresponds to a directory data fragment associated with leaf node 603. Leaf nodes 606, 607 correspond to directory data fragments associated with leaf node 605. The directory data fragment node may store one or more entries. A directory data fragment node may store a finite number of entries. In some embodiments, the maximum number of entries is 256. Each of the one or more entries may store a child ID (e.g., file name, directory name, sub-directory name) and an inode id. For example, a parent inode of a file directory tree structure of a primary system may include a first pointer to a first child inode, a second pointer to a second child inode, and a third pointer to a third child inode. The directory data fragment that is associated with the parent inode may store a first entry that identifies a first child and an identifier of the first child inode, a second entry that identifies a second child and an identifier of the second child inode, and a third entry that identifies a third child and an identifier of the third child inode.

In the example shown, leaf node 607 includes an entry that references metadata structure 612 and an inode id associated with the metadata structure 612. Metadata structure 612 may be configured to store metadata associated with a content file that allows the data associated with the content to be located.

Metadata structure 612 includes leaf nodes 613, 614, 615, 616. A leaf node of a metadata structure may be configured to store a value of a brick identifier that is associated with one or more data chunks of the first file. For example, leaf node 613 may be configured to store a brick identifier associated with a first subset of data chunks of the first file, leaf node 614 may be configured to store a brick identifier associated with a second subset of data chunks of the first file, leaf node 615 may be configured to store a brick identifier associated with a third subset of data chunks of the first file, and leaf node 616 may be configured to store a brick identifier associated with a fourth subset of data chunks of the first file.

FIG. 6B is a diagram illustrating a tree data structure in accordance with some embodiments. In the example shown, tree data structure 620 may be generated by a storage system, such as storage system 112. Tree data structure 620 illustrates part of a process of unlinking a deleted directory root node from its deleted directory root parent node.

A backup snapshot of a primary system and its corresponding file directory tree structure may be performed at a first moment in time. A storage system may generate file system metadata snapshot tree 601 that corresponds to a state of the primary system at the first moment in time. The file directory tree structure is comprised of a plurality inodes. Leaf nodes of file system metadata snapshot tree 601 include leaf nodes that correspond to the inodes of the file directory tree structure.

Portions of the file directory tree structure of a primary system may be deleted. For example, a directory and its one or more sub-directories and/or files may have been deleted. An incremental backup snapshot of the primary system may be performed at a second moment in time. A file system metadata snapshot tree corresponding to the incremental backup snapshot 602 may be generated by cloning the file system metadata snapshot tree corresponding to the previous backup snapshot 601 and updating the cloned file system metadata snapshot tree to reflect a state of the primary system at the second moment in time.

In the example shown, leaf node 603 corresponds to a root directory inode of the primary system's file directory tree structure and leaf node 605 corresponds to an intermediate directory inode of the primary system's file directory tree structure. The intermediate directory inode and its one or more sub-directories and/or files were deleted from the primary system after the first moment in time, but before the second moment in time. File system metadata snapshot tree 602 is updated to reflect the deletion. A storage system may reflect this deletion by unlinking the leaf node corresponding to the intermediate directory inode (i.e., leaf node 605) from the leaf node corresponding to the root directory inode (i.e., leaf node 603).

Unlinking the leaf node 605 from the leaf node 603 comprises updating leaf node 603 to include an intent that references the node to be deleted, updating leaf node 605 to include an intent that indicates the node is to be deleted, and removing an entry corresponding to the intermediate directory inode (i.e., the deleted directory) from the directory data fragment node 604. Leaf node 604 is associated with leaf node 603 and stores an entry that corresponds to the deleted directory associated with leaf node 605', an entry that corresponds to a directory or file associated with leaf node 608, and an entry that corresponds to a directory or file associated with leaf node 609. Leaf node 604 includes pointers to leaf nodes 605', 608, 609.

Leaf node 603 may be updated to include an intent that references the node that is to be deleted by performing a shadow copy of the leaf node 603 and updating the shadow copy node 603' to include the intent 622 that references a node that is to be deleted. The shadow copy node 603' includes a pointer to leaf node 604 because leaf node 603 includes a pointer to leaf node 604. In some embodiments, a node of file system metadata snapshot tree 602 (not shown), such as an intermediate node, may include a pointer to leaf node 603. After the shadow copy is performed, as depicted in FIG. 2C, the pointer of the leaf node may be updated to reference leaf node 603' instead of referencing leaf node 603. Leaf node 603 is still included in file system metadata snapshot tree 602, but is unreferenced.

Leaf node 605 may be updated to include an intent that indicates the node is to be deleted by performing a shadow copy of leaf node 605 and updating the shadow copy node 605' to include the intent 624 that indicates the node is to be deleted. Leaf node 604 includes a pointer to leaf node 605. After the shadow copy is performed, the pointer of leaf node 604 is updated to reference leaf node 605' instead of referencing leaf node 605. Leaf node 605 includes pointers to leaf nodes 606, 607.

Figure 6C:
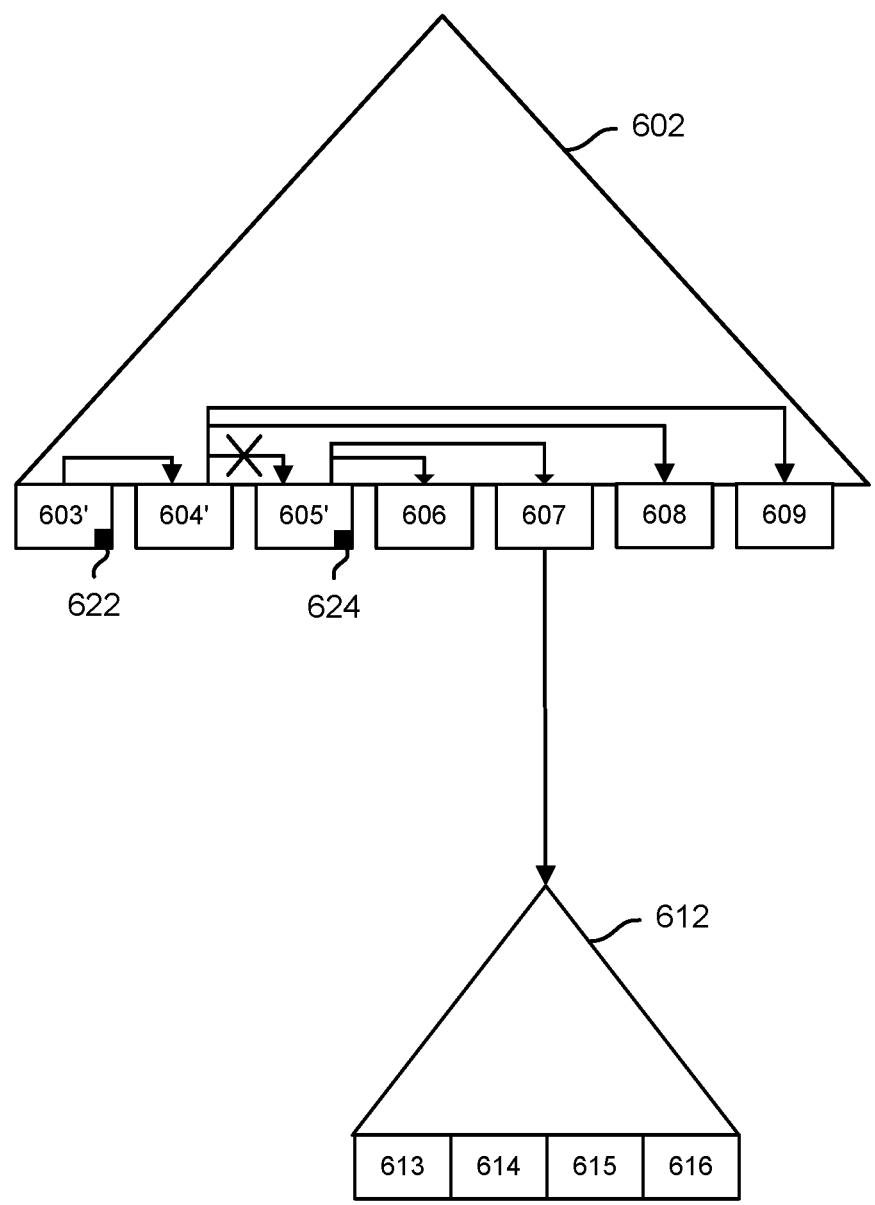
FIG. 6C is a diagram illustrating a tree data structure in accordance with some embodiments.

An intermediate node (not shown) may include a pointer to leaf node 605. After the shadow copy is performed, as depicted in FIG. 2C, the pointer of the intermediate node may be updated to reference leaf node 605' instead of leaf node 605. Leaf node 605 is still included in file system metadata snapshot tree 602, but is unreferenced. FIG. 6C is a diagram illustrating a tree data structure in accordance with some embodiments. In the example shown, tree data structure 640 may be generated by a storage system, such as storage system 112. A storage system may continue the unlinking process that was started in FIG. 6B by removing an entry that corresponds to a deleted directory from directory data fragment node 604. Leaf node 604 is a directory data fragment and stores information associated with a root directory inode to which leaf node 603' corresponds. The entry corresponding to the deleted directory may be deleted from leaf node 604 by performing a shadow copy of leaf node 604 and removing the entry corresponding to the intermediate directory inode from the shadow copy node 604'.

Leaf node 604 stores an entry that corresponds to a deleted directory associated with leaf node 605', an entry that corresponds to a directory or file associated with leaf node 608, and an entry that corresponds to a directory or file associated with leaf node 609. Leaf node 604 includes pointers to leaf nodes 605', 608, 609.

In FIG. 6B, leaf node 604 includes a pointer to leaf node 605'. Leaf node 604' of FIG. 6C corresponds to a shadow copy of leaf node 604 and initially includes an entry that corresponds to the deleted directory and a pointer to leaf node 605'. Leaf node 604' may be updated such that the entry that corresponds to the deleted directory is removed from leaf node 604' (represented by an "X" in FIG. 6C) and leaf node 604' no longer includes a pointer to leaf node 605'. Leaf node 603' initially includes a pointer to leaf node 604. After the shadow copy is performed, the pointer of leaf node 603' is updated to reference leaf node 604' instead of referencing leaf node 604. An intermediate node (not shown) may include a pointer to leaf node 604. After the shadow copy is performed, as depicted in FIG. 2C, the pointer of the intermediate node may be updated to reference leaf node 604' instead of leaf node 604. Leaf node 604 is still included in file system metadata snapshot tree 602, but is unreferenced.

Figure 6D:
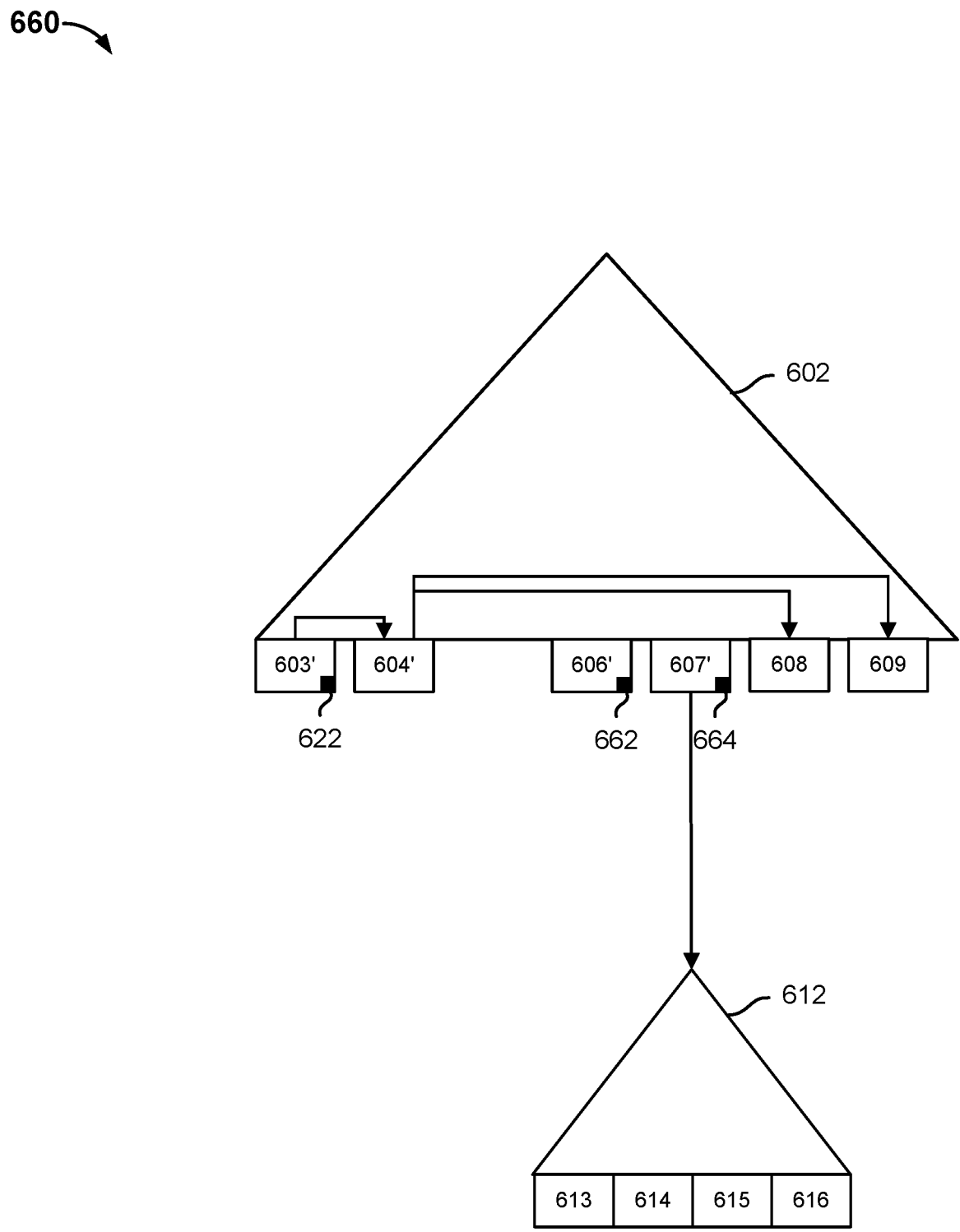
FIG. 6D is a diagram illustrating a tree data structure in accordance with some embodiments.

FIG. 6D is a diagram illustrating a tree data structure in accordance with some embodiments. In the example shown, tree data structure 660 may be generated by a storage system, such as storage system 112. A storage system may perform a garbage collection process by marking for deletion any descendant nodes of leaf node 605'. In this example, the descendant nodes of leaf node 605' are leaf nodes 606, 607. To mark leaf nodes 606, 607 for deletion, shadow copies of leaf nodes 606, 607 are generated and marked for deletion. Leaf node 605' is updated to reference leaf nodes 606', 607' instead of leaf nodes 606, 607, respectively. In this example, leaf node 606' (shadow copy of leaf node 606) and leaf node 607' (shadow copy of leaf node 607) are marked for deletion with 662 and 664, respectively. After leaf nodes 606', 607' are marked for deletion, leaf node 605' is deleted. A first intermediate node (not shown) may include a pointer to leaf node 606 and a second intermediate node (not shown) may include a pointer to leaf node 607. After the shadow copies are performed, as depicted in FIG. 2C, the pointer of the first intermediate node may be updated to reference leaf node 606' instead of leaf node 606 and the pointer of the second intermediate node may be updated to reference leaf node 607' instead of leaf node 607. Leaf nodes 606, 607 are still included in file system metadata snapshot tree 602, but are unreferenced.

Figure 6E:
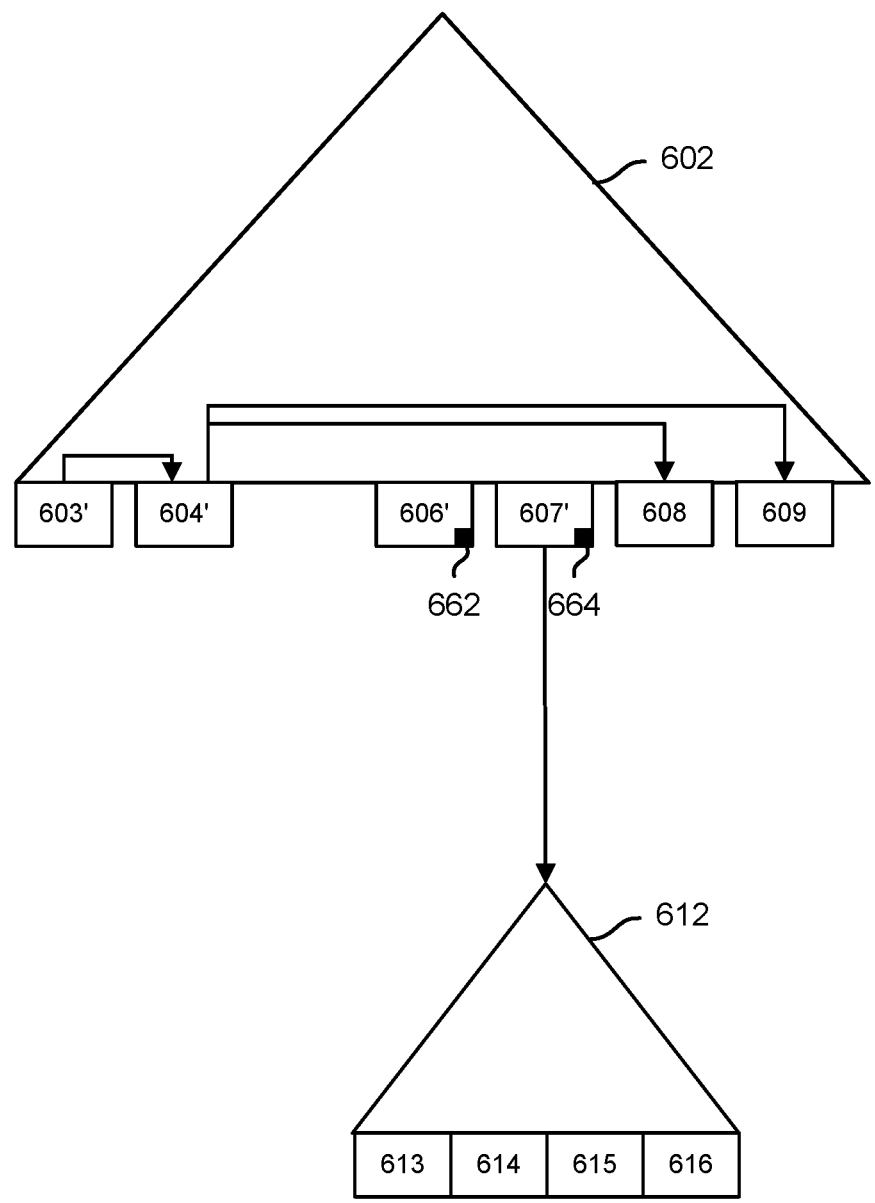
FIG. 6E is a diagram illustrating a tree data structure in accordance with some embodiments.

FIG. 6E is a diagram illustrating a tree data structure in accordance with some embodiments. In the example shown, tree data structure 680 may be generated by a storage system, such as storage system 112. A storage system may continue the garbage collection process shown in FIG. 6D by removing an update intent from leaf node 603'. In the example shown, update intent 622 has been removed from leaf node 603'.

Figure 6F:
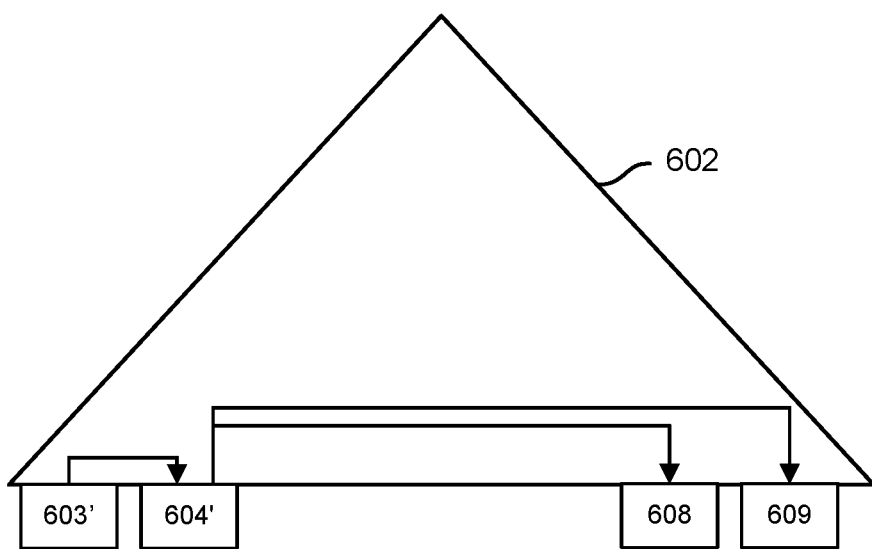
FIG. 6F is a diagram illustrating a tree data structure in accordance with some embodiments.
Figure 6F:
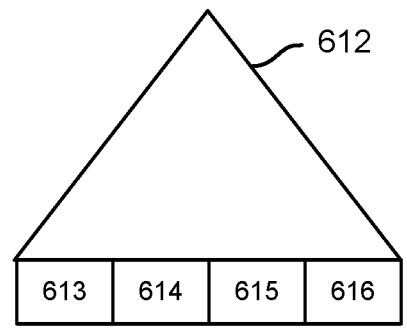

FIG. 6F is a diagram illustrating a tree data structure in accordance with some embodiments. In the example shown, tree data structure 690 may be generated by a storage system, such as storage system 112. A storage system may continue the garbage collection process by scanning a leaf level of the file system metadata snapshot tree 602 to determine one or more nodes that were previously marked for deletion. The storage system may have determined that leaf nodes 606', 607' were previously marked for deletion. The storage system may delete leaf nodes 606', 607'.

Figure 6G:
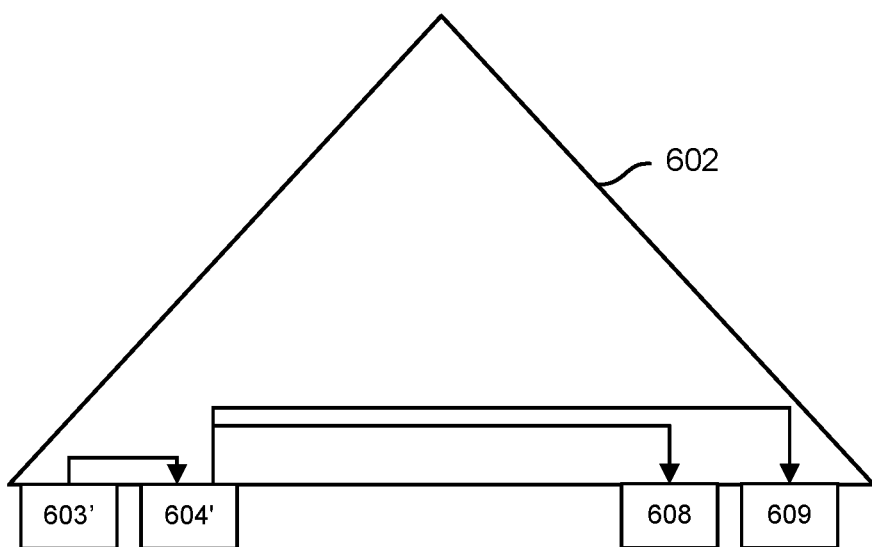
FIG. 6G is a diagram illustrating a tree data structure in accordance with some embodiments.

FIG. 6G is a diagram illustrating a tree data structure in accordance with some embodiments. In the example shown, tree data structure 695 may be generated by a storage system, such as storage system 112. A storage system may complete a garbage collection process by deleting unreferenced file metadata structures. During the unlinking process and garbage collection process described above, leaf nodes 603, 604, 605, 606, 607 (shown in FIG. 6A) and metadata structure 612 became unreferenced. The storage system may complete the garbage collection process by deleting unreferenced nodes and unreferenced metadata structures, such as leaf nodes 603, 604, 605, 606, 607, and metadata structure 612, from file system metadata snapshot tree 602.

Figure 7:
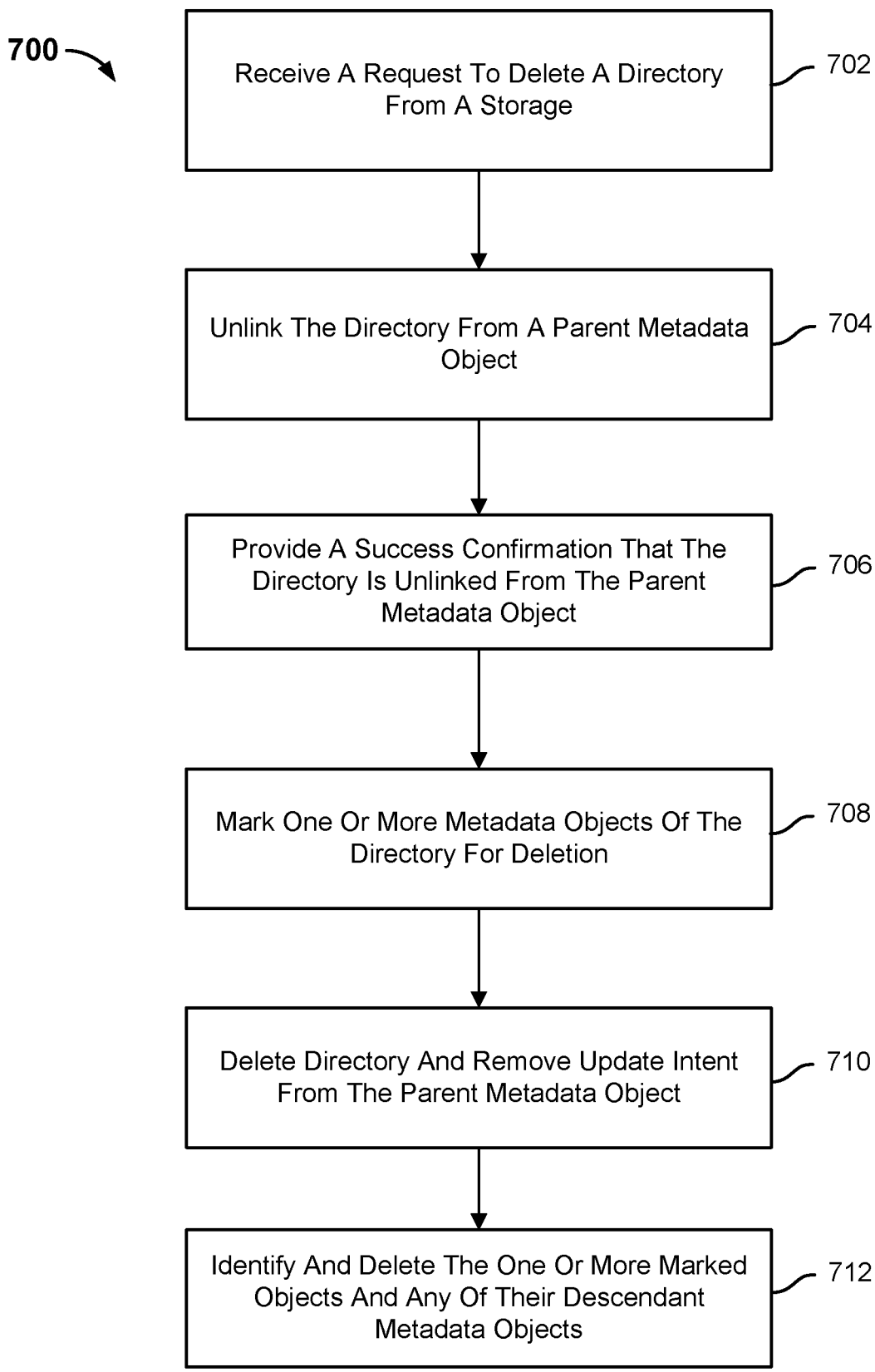
FIG. 7 is a flow chart illustrating a process for performing asynchronous deletion of a large directory in accordance with some embodiments.

FIG. 7 is a flow chart illustrating a process for performing asynchronous deletion of a large directory in accordance with some embodiments. In the example shown, process 700 may be implemented by a storage system, such as storage system 112.

At 702, a request to delete a directory from a storage is received. In some embodiments, an application or process may send the request to delete the directory from the storage. For example, an application that controls an overall operation of a storage system may send the request to an application that generates tree data structures for backup snapshots. In other embodiments, a user associated with the storage may send the request to delete the directory from the storage.

At 704, the directory is unlinked from a parent metadata object. A metadata object may correspond to a node of a file system metadata snapshot tree. A file system metadata snapshot tree may include a metadata object that corresponds to the parent inode of the deleted directory (e.g., leaf node 603 of FIG. 6A), a metadata object that corresponds to the inode of the deleted directory (e.g., leaf node 605 of FIG. 6A), and a directory data fragment metadata object that is associated with the metadata object that corresponds to the parent inode of the deleted directory (e.g., leaf node 604 of FIG. 6A). The directory data fragment metadata object that is associated with the metadata object that corresponds to the parent inode of the deleted directory includes an entry that references the deleted directory.

The storage system may unlink the metadata object that corresponds to the inode of the deleted directory (referred herein as a "deleted directory root metadata object") from the metadata object that corresponds to the parent inode of the deleted directory root metadata object (referred herein as a "deleted directory root parent metadata object") by updating the deleted directory root parent metadata object to include an update intent that references a metadata object that is to be deleted, updating the deleted directory root metadata object to include an update intent that indicates the metadata object is to be deleted, and removing an entry that corresponds to the deleted directory from the directory data fragment metadata object associated with the metadata object that corresponds to the parent inode of the deleted directory. Modifying the deleted directory root parent metadata object and the deleted directory root metadata object to include corresponding update intents enables the storage system to resume the unlinking process in the event the storage system crashes during the unlinking process.

The storage system may update the deleted directory root parent metadata object (e.g., leaf node 603 of FIG. 6A) and the deleted directory root metadata object (e.g., leaf node 605 of FIG. 6A) to include corresponding intents by performing corresponding shadow copies of the metadata objects and updating the corresponding shadow copies of the metadata objects to include the corresponding intents (e.g., leaf nodes 603', 605' of FIG. 6B). The storage system may remove an entry that corresponds to the deleted directory from the directory data fragment metadata object (e.g., leaf node 604 of FIG. 6B) associated with the deleted directory root parent metadata object by performing a shadow copy of the directory data fragment metadata object and removing the entry that corresponds to the deleted directory from the shadow copy of the directory data fragment metadata object (e.g., leaf node 604' of FIG. 6C).

At 706, a success confirmation that the directory is unlinked from the parent metadata object is provided. In some embodiments, the success confirmation is provided to the application or process that sent the request to delete the directory. In other embodiments, the success confirmation is provided to a user associated with the storage.

At 708, one or more metadata objects of the deleted directory are marked for deletion. The one or more metadata objects of the deleted directory may be marked for deletion during a garbage collection process.

The one or more directory data fragment metadata objects that are associated with deleted directory root metadata objects (e.g., leaf nodes 606, 607 of FIG. 6C) may be marked for deletion by performing corresponding shadow copies of the one or more directory data fragment metadata objects associated with deleted directory root metadata objects and marking for deletion the corresponding shadow copies (e.g., leaf nodes 606', 607' of FIG. 6D).

At 710, the directory is deleted and an update intent is removed from the parent metadata object. The metadata object corresponding to the deleted directory is removed from the file system metadata snapshot tree. An update intent is removed from the deleted directory root parent metadata object of the file system metadata snapshot tree corresponding to the incremental backup snapshot.

At 712, the one or more marked objects and any of their descendant metadata objects are identified and deleted.

The garbage collection process may comprise the storage system scanning a leaf level of the file system metadata snapshot tree corresponding to an incremental backup snapshot to determine one or more metadata objects that were previously marked for deletion. For the one or more metadata objects that were previously marked for deletion, the storage system may determine whether the one or more metadata objects that were marked for deletion are associated with any descendant metadata objects by reading one or more directory data fragments that are associated with the one or more metadata objects that were previously marked for deletion. In the event the one or more metadata objects that were previously marked for deletion are associated with one or more descendant metadata objects, the one or more descendant metadata objects are marked for deletion and the one or more metadata objects that were previously marked for deletion are deleted. In the event the one or more metadata objects that were previously marked for deletion are not associated with one or more descendant metadata objects, the one or more metadata objects that were previously marked for deletion are deleted. The storage system recursively performs this process until the one or more metadata objects that are marked for deletion are not associated with any descendant metadata objects.

Figure 8:
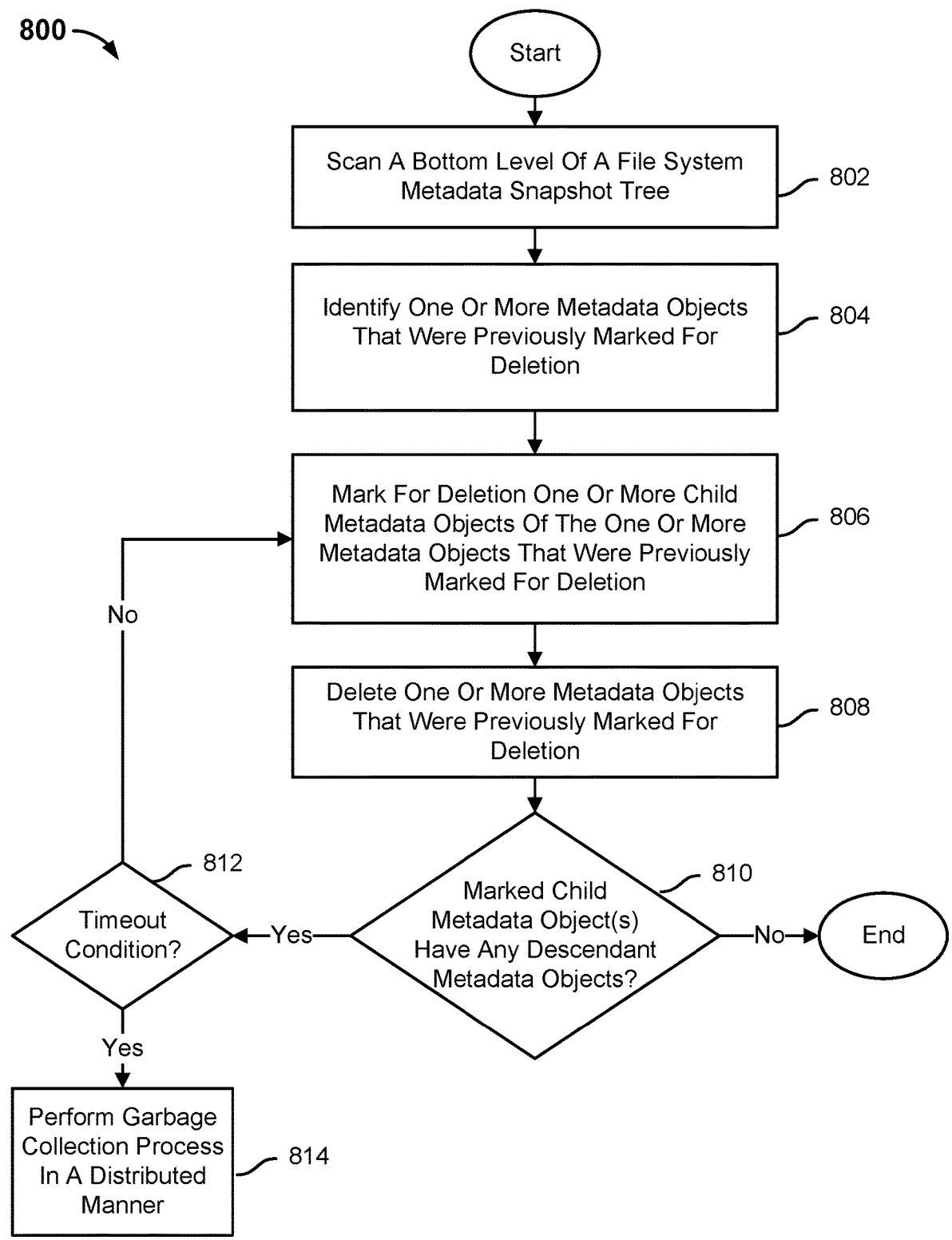
FIG. 8 is a flow chart illustrating a process for performing garbage collection in accordance with some embodiments.

FIG. 8 is a flow chart illustrating a process for performing garbage collection in accordance with some embodiments. In the example shown, process 800 may be implemented by a storage system, such as storage system 112. In some embodiments, process 800 is implemented to perform some or all of steps 710 and/or 712 of process 700.

The garbage collection process may be comprised of two phases. The first phase of the garbage collection process may include a metadata analysis that identifies metadata objects to delete. The second phase of the garbage collection process may include an action execution phase where the identified metadata is deleted. The garbage collection process may switch back-and-forth between the two phases until the directory and its descendant metadata objects have been deleted.

At 802, a leaf level of a file system metadata snapshot tree is scanned. A leaf level of a file system metadata snapshot tree (e.g., a leaf node level) is comprised of a plurality of metadata objects. Some of the metadata objects of the leaf level correspond to inodes of a primary system's file directory tree structure. The leaf level of the file system metadata snapshot tree is scanned to identify which of the metadata objects of the leaf level were previously marked for deletion.

At 804, one or more metadata objects that were previously marked for deletion are identified. The one or more identified metadata objects may correspond to one or more directory data fragments of a deleted directory. The one or more identified metadata objects were previously marked for deletion prior to the directory being deleted. The one or more directory data fragments include entries that reference one or more other metadata objects. The one or more other metadata objects may correspond to a metadata object that corresponds to a sub-directory of the deleted directory or a metadata object objects that corresponds to a file of the deleted directory.

At 806, one or more children metadata objects of the one or more metadata objects that were previously marked for deletion are marked for deletion. The one or more other metadata objects referenced by the one or more directory data fragments, i.e., the one or more children metadata objects, are marked for deletion. For example, a metadata object objects that corresponds to a sub-directory of a deleted directory may be marked for deletion. A metadata object that corresponds to a file of the deleted directory may be marked for deletion. The one or more other metadata objects referenced by the one or more directory data fragments may be marked for deletion by performing a shadow copy, as described above, of the one or more other metadata objects referenced by the one or more directory data fragments and marking the shadow copies of the one or more other metadata objects referenced by the one or more directory data fragments.

At 808, the one or more metadata objects that were previously marked for deletion are deleted. In some embodiments, a metadata object corresponding to a sub-directory is deleted. In some embodiments, a metadata object corresponding to a sub-directory data fragment is deleted. In some embodiments, a metadata object corresponding to a file is deleted.

At 810, it is determined whether the marked metadata object(s) have any descendant metadata objects. In the event the marked child metadata object(s) have descendant metadata objects, process 800 proceeds to 812. In the event the marked child metadata object(s) do not have any descendant metadata objects, process 800 ends.

At 812, it is determined whether a timeout condition has been reached. A timeout condition has been reached in the event the garbage collection process has taken longer than a threshold amount of time. For example, the garbage collection process may have started with an initial metadata object that was marked for deletion, but that initial metadata object that was marked for deletion has a large number of descendant levels comprised of a plurality of descendant metadata objects (e.g., a number of descendant levels greater than a level threshold).

In the event it is determined that a timeout condition has been reached, process 800 proceeds to 814. In the event it is determined that a timeout condition has not been reached, process 800 returns to 806.

At 814, the garbage collection process is performed in a distributed manner. In some embodiments, the garbage collection process dynamically changes the number of storage nodes performing the garbage collection process (e.g., one storage node to four storage nodes). In some embodiments, the garbage collection process is paused and is resumed at a later point in time. When the garbage collection is resumed at the later point in time, the garbage collection process is performed in a distributed manner and restarts at 802 because the storage system performing the garbage collection process wants to use the most up-to-date metadata information. It may be more efficient to resume the garbage collection process at the later point in time because the storage system may perform the garbage collection process in a distributed manner by distributing the garbage collection process among a plurality of storage nodes of the storage system and resources may be allocated to portions of a file metadata snapshot tree that are known to include more deletions.

Figure 9:
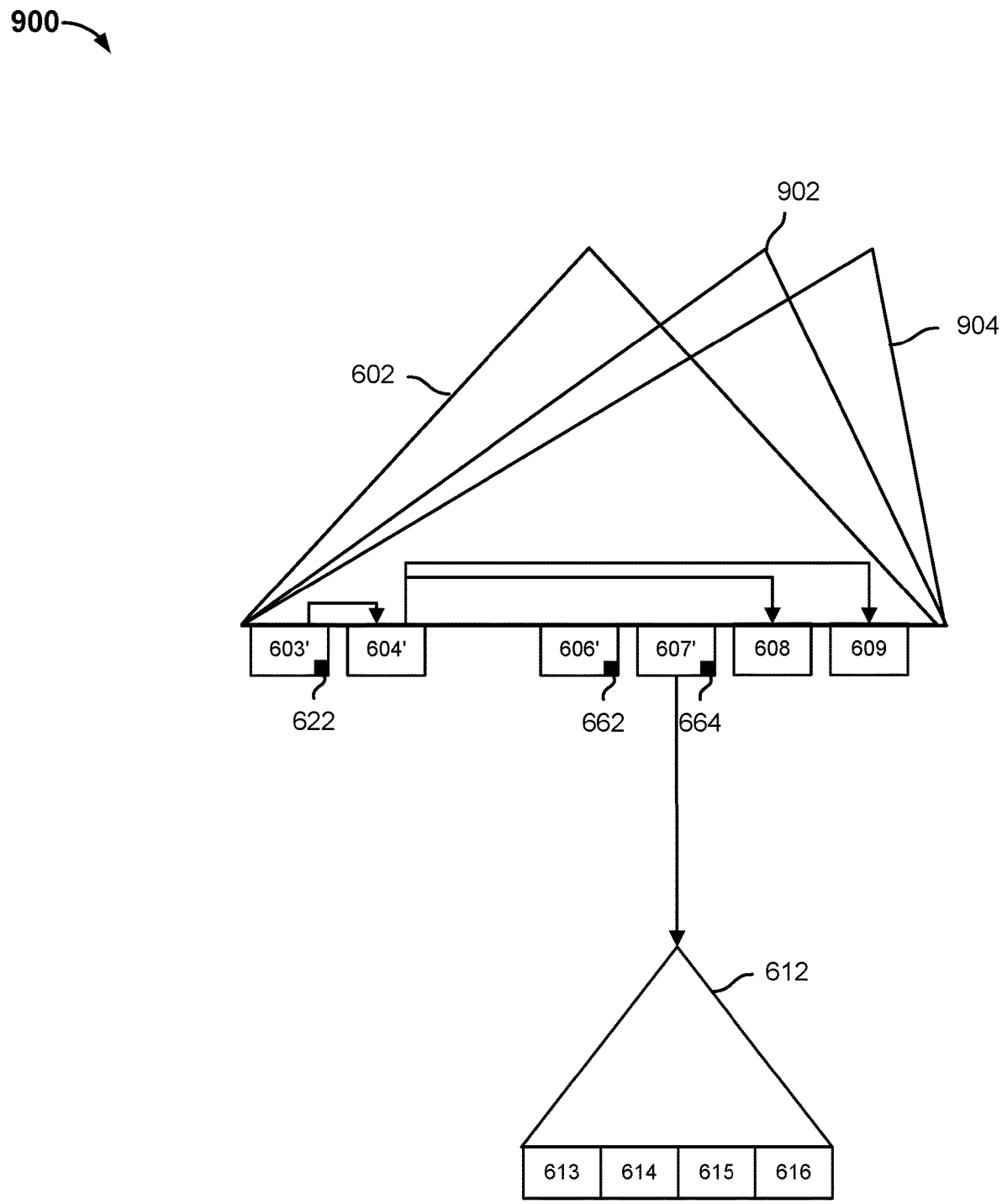
FIG. 9 is a diagram illustrating a tree data structure in accordance with some embodiments.

FIG. 9 is a diagram illustrating a tree data structure in accordance with some embodiments. In the example shown, tree data structure 900 may be generated by a storage system, such as storage system 112. A node may be referred to as a "metadata object." In some instances, a file system metadata snapshot tree corresponding to an incremental backup snapshot is cloned before the garbage collection process has finished deleting the one or more nodes marked for deletion and their children nodes. As a result, nodes that are marked for deletion and their children nodes are propagated to the cloned file system metadata snapshot trees.

In the example shown, file system metadata snapshot tree 602 is in a state depicted in FIG. 6D. File system metadata snapshot tree 602 is cloned prior to a garbage collection process being able to delete leaf nodes 606', 607' and metadata structure 612. File system metadata snapshot tree 902 is generated. File system metadata snapshot tree 902 also includes leaf nodes 606', 607' and metadata structure 612. File system metadata snapshot tree 902 is cloned prior to a garbage collection process being able to delete leaf nodes 606', 607' and metadata structure 612. File system metadata snapshot tree 904 is generated. File system metadata snapshot tree 904 also includes leaf nodes 606', 607' and metadata structure 612.

Figure 10:
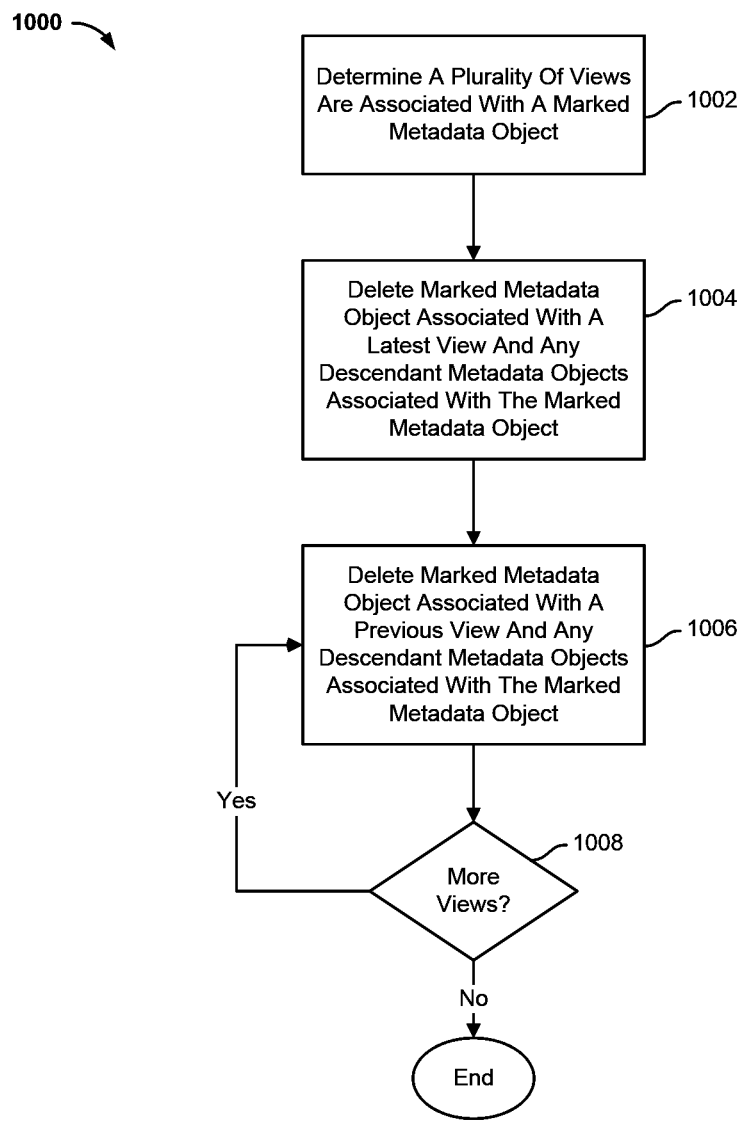
FIG. 10 is a flow chart illustrating a process for performing garbage collection in accordance with some embodiments.

FIG. 10 is a flow chart illustrating a process for performing garbage collection in accordance with some embodiments. In the example shown, process 1000 may be implemented by a storage system, such as storage system 112. In some embodiments, process 1000 is implemented to perform some or all of step 712 of process 700.

At 1002, a plurality of views are determined to be associated with a marked metadata object. A metadata object marked for deletion may be propagated to one or more file system metadata snapshot trees. For example, a file system metadata snapshot tree that includes a marked metadata object may be cloned prior to a garbage collection process having been able to delete the marked metadata object. As a result, a plurality of file system metadata snapshot trees include references to a metadata object marked for deletion. The plurality of views that are associated with the marked metadata object may be determined by performing a bottom-up tree walk of a file system metadata snapshot tree that includes the metadata object marked for deletion and determining that a plurality of root metadata objects associated with a plurality of file system metadata snapshot trees indirectly reference the marked metadata object.

At 1004, the marked metadata object associated with a latest view and any descendant metadata objects associated with the marked metadata object are deleted. A latest view associated with the marked metadata object is determined from the bottom-up tree walk of file system metadata snapshot trees that include the marked metadata object. A file system metadata snapshot tree may be comprised of n levels. In some embodiments, n is 127.

A bottom-up tree walk of the file system metadata snapshot trees may include scanning a bottom level (e.g., level 0) of the file system metadata snapshot trees to identify the marked metadata object and scanning a next level (e.g., level 1) of the file system metadata snapshot trees to identify a first set of one or more metadata objects that directly reference the marked metadata object. The bottom-up tree walk may further include scanning a next level (e.g., level 2) of the file system metadata snapshot trees to identify a second set of one or more metadata objects that directly reference the first set of one or more metadata objects that directly reference the marked metadata object. This process continues until a top level of the file system metadata snapshot trees are scanned to identify root metadata objects that indirectly reference (e.g., through the metadata objects identified at each level) the marked metadata object. Each root metadata object is associated with a corresponding timestamp. A timestamp may indicate when the file system metadata snapshot tree was generated. The timestamps associated with each of the identified root metadata objects are compared and the file system metadata snapshot tree that includes the root node with the later timestamp is identified as the latest view.

The garbage collection process may prioritize the latest view over one or more previous views of data that include the marked metadata object, and delete from the latest view the marked metadata object and any descendant metadata objects associated with the marked metadata object in a manner described with respect to FIG. 8.

At 1006, the marked metadata object associated with a previous view and any descendant metadata objects associated with the marked metadata object are deleted. A garbage collection process deletes the marked metadata object associated with the previous view and any child metadata objects associated with the marked metadata object in a manner described with respect to FIG. 8.

At 1008, it is determined whether there are any more views that are associated with the marked metadata object. In the event there are still views that are associated with the marked metadata object, process 1000 returns to 1006. In the event there are no more views that are associated with the marked metadata object, process 1000 ends.

Figure 11:
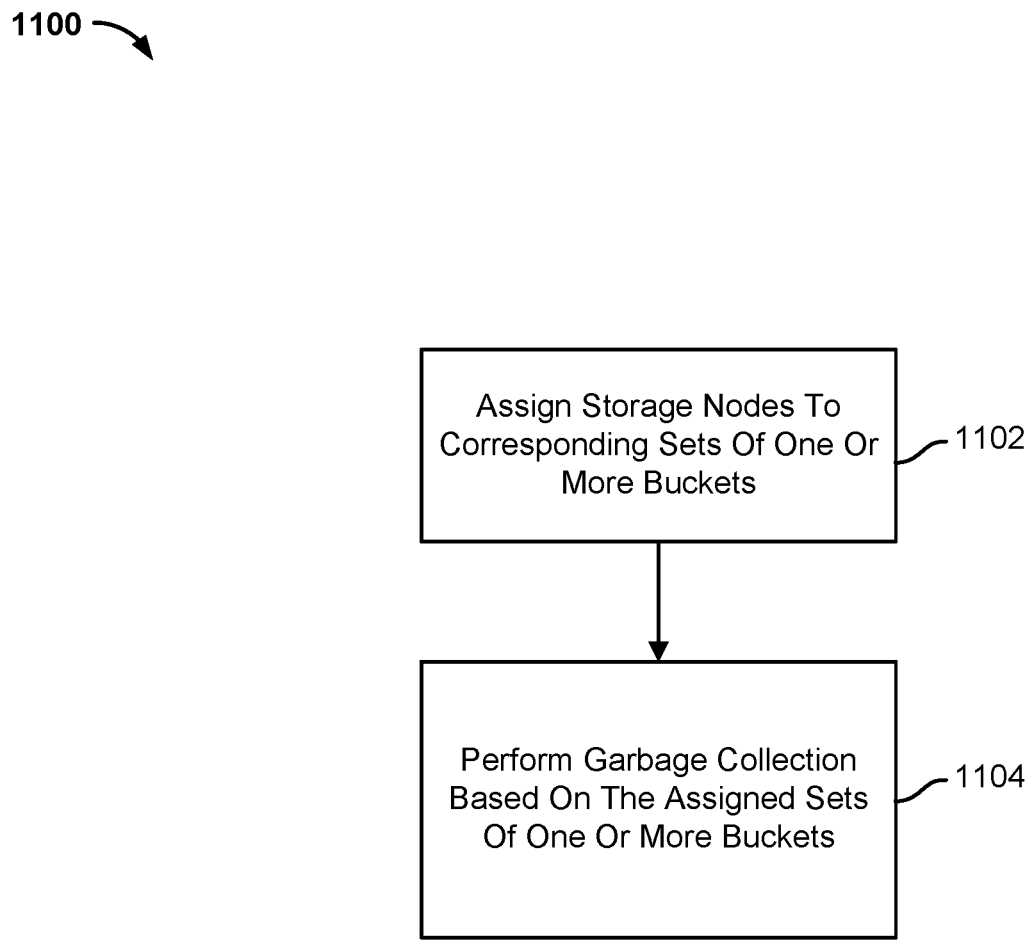
FIG. 11 is a flow chart illustrating a process for distributing a garbage collection process in accordance with some embodiments.

FIG. 11 is a flow chart illustrating a process for distributing a garbage collection process in accordance with some embodiments. In the example shown, process 1100 may be implemented by a storage system, such as storage system 112.

At 1102, storage nodes are assigned to corresponding sets of one or more buckets. A bucket is comprised of a plurality of key-value pairs. A key-value pair may be stored by a leaf node of a file system metadata snapshot tree. A leaf node of the file system metadata snapshot tree may be marked for deletion.

At 1104, garbage collection is performed by the plurality of storage nodes based on the assigned sets of one or more buckets. For example, a first storage node may be assigned a first set of buckets, a second storage node is assigned a second set of buckets, and a third storage node is assigned a third set of buckets. The first storage node is configured to perform garbage collection with respect to the key-value pairs included in the first set of buckets, the second storage node is configured to perform garbage collection with respect to the key-value pairs included in the second set of buckets, and the third storage node is configured to perform garbage collection with respect to the key-value pairs included in the third set of buckets.

A storage node may determine if any of the key-value pairs included in an assigned set of buckets correspond to leaf nodes that are marked for deletion. In the event a key-value pair included in an assigned set of buckets corresponds to leaf nodes that are marked for deletion, the storage node performs garbage collection with respect to the key-value pair in a manner described above.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a request to delete a directory from a storage;
unlinking a first leaf node of a tree data structure corresponding to the directory from a second leaf node of the tree data structure corresponding to a parent metadata object of the directory, wherein unlinking the first leaf node of the tree data structure corresponding to the directory from the second leaf node of the tree data structure corresponding to the parent metadata object of the directory comprises updating the first leaf node of the tree data structure corresponding to the directory and the second leaf node of the tree data structure corresponding to the parent metadata object of the directory to include corresponding update intents;
providing a success confirmation that the first leaf node of the tree data structure corresponding to the directory is unlinked from the second leaf node of the tree data structure corresponding to the parent metadata object; and
after providing the success confirmation:
marking for deletion one of more nodes of the tree data structure corresponding to one or more metadata objects of the directory; and
identifying and deleting the one or more nodes of the tree data structure corresponding to the one or more marked nodes of the tree data structure corresponding to the one or more metadata objects and at least one of their descendant metadata objects.

2. The method of claim 1, wherein unlinking the first leaf node of the tree data structure corresponding to the directory from the second leaf node of the tree data structure corresponding to the parent metadata object of the directory further comprises removing from a metadata object associated with the parent metadata object a reference to the directory.

3. The method of claim 1, further comprising deleting the first leaf node of the tree data structure corresponding to the directory.

4. The method of claim 1, further comprising removing an update intent from the second leaf node corresponding to the parent metadata object of the directory.

5. The method of claim 1, wherein identifying the one or more marked nodes of the tree data structure corresponding to the one or more metadata objects comprises scanning a leaf level of the tree data structure.

6. The method of claim 5, further comprising marking for deletion the descendant metadata objects of the one or more marked nodes of the tree data structure corresponding to the one or more metadata objects.

7. The method of claim 6, wherein the one or more marked nodes of the tree data structure corresponding to the one or more metadata objects are deleted after the descendant metadata objects of the one or more marked nodes of the tree data structure corresponding to the one or more metadata objects are marked for deletion.

8. The method of claim 1, wherein the one or more marked nodes of the tree data structure corresponding to the one or more metadata objects of the directory are associated with a plurality of views.

9. The method of claim 8, further comprising determining a latest view of the plurality of views that includes the one or more marked nodes of the tree data structure corresponding to the one or more metadata objects of the directory.

10. The method of claim 9, wherein the one or more marked nodes of the tree data structure corresponding to the one or more metadata objects and any of their descendant metadata objects are deleted from the latest view of the plurality of views.

11. The method of claim 10, wherein the one or more marked nodes of the tree data structure corresponding to the one or more metadata objects and any of their descendant metadata objects are deleted from a next latest view of the plurality of views.

12. The method of claim 1, wherein the storage is comprised of a plurality of storage nodes.

13. The method of claim 12, wherein the plurality of storage nodes are assigned a corresponding subset of a set of the one or more metadata objects.

14. The method of claim 13, wherein the plurality of storage nodes perform the step of identifying and deleting the one or more marked nodes of the tree data structure corresponding to one or more metadata objects and any of their descendant metadata objects for their corresponding subset of the set of the one or more metadata objects.

15. The method of claim 1, wherein identifying and deleting the one or more marked metadata nodes of the tree data structure corresponding to one or more objects and any of their descendant metadata objects includes determining whether a timeout condition has been satisfied.

16. The method of claim 15, wherein in response to determining that the timeout condition has been satisfied:
pausing the identifying and deleting of the one or more marked nodes of the tree data structure corresponding to one or more metadata objects and any of their descendant metadata objects; and
resuming the identifying and deleting of the one or more marked nodes of the tree data structure corresponding to one or more metadata objects and any of their descendant metadata objects in a distributed manner.

17. A computer program product, the computer program product being embodied in a non-transitory computer readable storage medium and comprising computer instructions for:
receiving a request to delete a directory from a storage;
unlinking a first leaf node of a tree data structure corresponding to the directory from a second leaf node of the tree data structure corresponding to a parent metadata object of the directory, wherein unlinking the first leaf node of the tree data structure corresponding to the directory from the second leaf node of the tree data structure corresponding to the parent metadata object of the directory comprises updating the first leaf node of the tree data structure corresponding to the directory and the second leaf node of the tree data structure corresponding to parent metadata object of the directory to include corresponding update intents;
providing a success confirmation that the first leaf node of the tree data structure corresponding to the directory is unlinked from the second leaf node of the tree data structure corresponding to the parent metadata object; and
after providing the success confirmation:
marking for deletion one of more nodes of the tree data structure corresponding to one or more metadata objects of the directory; and
identifying and deleting the one or more nodes of the tree data structure corresponding to the one or more marked nodes of the tree data structure corresponding to one or more metadata objects and at least one of their descendant metadata objects.

18. The computer program product of claim 17, wherein unlinking the first leaf node of the tree data structure corresponding to the directory from the second leaf node of the tree data structure corresponding to the parent metadata object of the directory comprises
removing from a metadata object associated with the parent metadata object a reference to the directory.

19. A system, comprising:
a processor; and
a memory coupled with the processor, wherein the memory is configured to provide the processor with instructions which when executed cause the processor to:
receive a request to delete a directory from a storage;
unlink a first leaf node of a tree data structure corresponding to the directory from a second leaf node of the tree data structure corresponding to a parent metadata object of the directory, wherein to unlink the first leaf node of the tree data structure corresponding to the directory from the second leaf node of the tree data structure corresponding to the parent metadata object of the directory, the processor is configured to update the first leaf node of the tree data structure corresponding to the directory and the second leaf node of the tree data structure corresponding to parent metadata object of the directory to include corresponding update intents;
provide a success confirmation that the first leaf node of the tree data structure corresponding to the directory is unlinked from the second leaf node of the tree data structure corresponding to the parent metadata object; and
after providing the success confirmation:
mark for deletion one of more nodes of the tree data structure corresponding to one or more metadata objects of the directory; and
identify and deleting the one or more nodes of the tree data structure corresponding to the one or more marked nodes of the tree data structure corresponding to one or more metadata objects and at least one of their descendant metadata objects.

* * * * *

UNITED STATES PATENT AND TRADEMARK OFFICE
CERTIFICATE OF CORRECTION

| | | |
|---|---|---|
| PATENT NO. | : 11,500,817 B2 | Page 1 of 1 |
| APPLICATION NO. | : 16/871408 | |
| DATED | : November 15, 2022 | |
| INVENTOR(S) | : Anirvan Duttagupta et al. | |

It is certified that error appears in the above-identified patent and that said Letters Patent is hereby corrected as shown below:

In the Specification

In Column 34, Line 34, after "object" delete "objects".
In Column 34, Line 42, after "object" delete "objects".

In the Claims

In Column 40, Line 35, Claim 19, before "parent" insert --the--.

Signed and Sealed this
Fifth Day of September, 2023

Katherine Kelly Vidal
*Director of the United States Patent and Trademark Office*